US005913248A

United States Patent [19]

Harada et al.

[11] Patent Number: 5,913,248

[45] Date of Patent: Jun. 15, 1999

[54] SURGE DETECTION DEVICE AND TURBOMACHINERY THEREWITH

[75] Inventors: Hideomi Harada; Shin Konomi; Kazuo Takei, all of Kanagawa-ken, Japan

[73] Assignee: Ebara Corporation, Japan

[21] Appl. No.: 08/896,839

[22] Filed: Jul. 18, 1997

Related U.S. Application Data

[62] Division of application No. 08/471,317, May 19, 1995, Pat. No. 5,683,223.

[30] Foreign Application Priority Data

| | | | |
|---|---|---|---|
| May 27, 1994 | [JP] | Japan | 6-132558 |
| May 27, 1994 | [JP] | Japan | 6-138081 |
| May 27, 1994 | [JP] | Japan | 6-138083 |
| May 19, 1994 | [JP] | Japan | 6-129557 |

[51] Int. Cl.[6] ................ G01F 1/38; G01L 3/00

[52] U.S. Cl. ................ 73/861.47; 73/199; 73/115

[58] Field of Search ................ 73/861.47, 746, 73/199, 279, 861.356, 861.79, 115; 60/39.02, 39.27, 261, 209; 415/48, 118, 32, 63

[56] References Cited

U.S. PATENT DOCUMENTS

| | | | |
|---|---|---|---|
| 2,382,913 | 8/1945 | Robinson . | |
| 2,470,565 | 5/1949 | Loss . | |
| 2,733,853 | 2/1956 | Trumpler . | |
| 3,327,933 | 6/1967 | Baumann et al. . | |
| 3,362,624 | 1/1968 | Endress . | |
| 3,372,862 | 3/1968 | Koenig et al. . | |
| 3,868,625 | 2/1975 | Speigner et al. | 60/223 |
| 3,963,367 | 6/1976 | Stalker et al. . | |
| 3,994,166 | 11/1976 | Dower | 73/205 R |
| 4,403,914 | 9/1983 | Rogo et al. . | |
| 4,460,310 | 7/1984 | Plunkett . | |
| 4,502,831 | 3/1985 | Sato et al. . | |
| 4,503,684 | 3/1985 | Monut et al. . | |
| 4,594,051 | 6/1986 | Gaston | 415/48 |
| 4,603,546 | 8/1986 | Collins | 60/39.02 |
| 4,616,483 | 10/1986 | Leonard . | |
| 4,686,834 | 8/1987 | Haley et al. | 62/209 |
| 4,768,338 | 9/1988 | Lindler et al. | 60/39.27 |
| 4,780,049 | 10/1988 | Palmer et al. . | |
| 4,969,798 | 11/1990 | Sakai et al. . | |
| 5,095,714 | 3/1992 | Adachi et al. . | |
| 5,452,986 | 9/1995 | Osborne et al. . | |

FOREIGN PATENT DOCUMENTS

| | | |
|---|---|---|
| 53-113308 | 10/1978 | Japan . |
| 55-114896 | 2/1979 | Japan . |
| 58-057098 | 9/1981 | Japan . |
| 57-56699 | 4/1982 | Japan . |
| 57 157100 | 9/1982 | Japan . |
| 57-157100 | 9/1982 | Japan . |
| 59-077089 | 10/1982 | Japan . |
| 59-079097 | 10/1982 | Japan . |
| 3199700 | 12/1989 | Japan . |
| 4-47197 | 2/1992 | Japan . |
| 6-17788 | 1/1994 | Japan . |
| 24233 | 2/1914 | United Kingdom . |
| 641635 | 8/1950 | United Kingdom . |
| 731822 | 6/1955 | United Kingdom . |
| 2 060 210 | 4/1981 | United Kingdom . |

*Primary Examiner*—Hezron Williams
*Assistant Examiner*—Helen C. Kwok
*Attorney, Agent, or Firm*—Armstrong, Westerman, Hattori, McLeland & Naughton

[57] ABSTRACT

A turbomachine having variable-angle diffuser vanes operates by regulating the angle of the diffuser vanes on the basis of the sensors disposed on the pump body or pipes of a surge detection device. The onset of surge can be forecast by measuring the fluctuations in the operating parameter(s) over a measuring interval of time computed on the basis of the operating characteristics of the impeller of the turbomachine. The onset of surge is prevented by adjusting the angle of the diffuser vanes in accordance with the sampling duration for parameter fluctuations over the measuring interval of time, and by adjusting the diffuser vanes to maintain the operating parameter fluctuations of the fluid machinery below a threshold value of the turbomachine derived from the design flow rate of the turbomachine. Application of the surge detection device in combination with fluid flow guide vanes and blades of the turbomachine enables full utilization of the potential capability of the turbomachine.

6 Claims, 23 Drawing Sheets diffuser vane performance curve

SURGE DETECTION DEVICE AND TURBOMACHINERY THEREWITH

This is a divisional of application Ser. No. 08/471,317 filed May 19, 1995 now U.S. Pat. No. 5,683,223.

BACKGROUND OF THE INVENTION

1. Field of the Invention

The present invention relates to a surge detection device applicable to centrifugal and mixed flow pumps, blowers, and compressors, and relates also to a turbomachine having variable guide vanes and the surge detection device 2. Description of the Related Art When a centrifugal or mixed flow pump is operated below the design flow rate of the pump, flow separation occurs in the impeller and diffuser and other components in the pump, and the flow undergoes a periodic pressure fluctuation. This leads to a phenomenon called "surge" which causes the system as a whole to begin self-induced vibration, thereby disabling pump operation. To avoid the onset of surge, this phenomenon must be detected early in the operation of the pump, and some remedial steps must be taken to prevent surge from occurring.

Conventionally, surge condition of the pump is judged by monitoring some operating parameters such as pressure, flow rate, temperature and time-averaged operating parameters, and comparing the monitored results with previously-determined values of the parameters to determine whether the system is surging or operating normally.

In the prior art, surge is determined by detecting a rapidly rising temperature in the following techniques disclosed in: a Japanese Patent Application (JPA), Second Publication, H5-53956, a JPA, First Publication, S62-113889, a JPA, First Publication, S59-77089, a JPA, First Publication, S59-79097, a JPA, First Publication, S56-2496, for example. An increase in pressure is used as a surge signal in the techniques disclosed in a JPA, First Publication, S63-161362; a JPA, First Publication, S58-57098; and a JPA, First Publication, S55-114896, for example. Surge is detected as a pressure difference between a hub and a shroud of a diffuser in a JPA, First Publication, H3-199700; as a pressure difference between a pressure surface and a suction surface of the diffuser vane, in a JPA, First Publication, S62-51794; and from the pressure waveforms in a JPA, First Publication, S63-94098, for example Other techniques utilize: the rate of change of lift as a measure of the efficiency of the blades as disclosed in a JPA, First Publication, S57-129297; or the differentials of the axial vibrations in a JPA, First Publication, H4-47197; or detection of vibrations with a microphone as disclosed in a JPA, First Publication, H3-213696, for example All such conventional techniques are based an indirect approach of comparing a pre-determined value of some time-averaged operating parameters, such as pressure and temperature, with the current operating parameters for the determination of the surge state of a system. Therefore, a quick and accurate determination of surge is difficult with these conventional techniques, because the problem in the existing techniques is that even though pre-testing runs are performed to determine the surge condition of a test system, it is not possible to determine the surge condition of another actual system accurately, because the onset of surge depends on the capacity of the piping in the operating system. Furthermore, because the detection is based on time-averaging of operating parameters, detection lags the onset of surge, and therefore, the response action is delayed, and for such reasons, the existing devices are of limited practical use.

The present invention is presented to solve the problems in the existing surge detection devices and turbomachine based on the existing techniques of surge detection, and an objective is to present a surge detection device which is capable of detecting surge condition rapidly and accurately in a turbomachine operating at a flow rate less than the design flow rate, and to present a turbomachinery which can be operated even at low flow rates by providing a rapid and accurate indication of surge based on the surge detection device of the present invention.

SUMMARY OF THE INVENTION

Surge is a phenomenon of self-excited vibrations taking place in piping, and leads to vibrations in piping, fluid flowing therein and pump itself. Therefore, it can be understood that if the vibrations can be detected, surge can be detected early in its formation. The present invention presents a solution to the problems in the conventional surge control methods, by providing an accurate and rapid method for determining an index of an onset of surge by a computational process of the vibrational amplitude associated with surge.

The inventors performed background experiments to study the effects of varying flow rates on vibrations in the turbomachinery, by installing pressure sensors at suction pipes, the diffuser and the discharge pipes. FIG. 25(*a*) shows the waveforms from the pressure sensors: where the left graphs relate to the pressure fluctuations detected at two locations (A, and B) in the peripheral direction of the diffuser; and the right graphs relate to the pressure fluctuations observed at the suction pipe and the discharge pipe. As is seen from these traces, when the flow rate is decreased below the design flow rate, large pressure fluctuations are observed, initially in the diffuser (refer to left traces at flow rate 2), and when the flow rate is decreased still further, large pressure fluctuations are observed in the pipes (refer to right traces at flow rate 3), indicating that surge is taking place.

The trend towards surge in the pump is illustrated, in FIG. 25(*b*), in terms of the non-dimensional flow rate normalized by the design flow rate and the non-dimensional head coefficient normalized by the design head value of the compressor. The flow rates 1, 2 and 3 in FIG. 25(*b*) correspond to those shown in FIG. 25(*a*).

Therefore, by detecting such variations quantitatively and using a suitable threshold value, it is possible to provide an early warning and take quick remedial steps to prevent the onset of surge. To enable such an approach, a measurement technique for parameter fluctuations at various locations in the system, and a computational process based on the measurement technique are required.

The fluid flow patterns at various flow rates are illustrated in FIG. 26. At the exit region of the impeller 3, the flow directions are shown by arrows A (at the design flow rate); B (at low flow rates); and C (at high flow rates). As can be seen clearly in the illustration, at flow rates other than at the design flow rate, the direction of fluid flow has the negative incidence angle on the vanes 5 of the diffuser 4 at high flow rates; and has the positive incidence angle on the vanes 5 of the diffuser 4 at low flow rates. Under the condition of low flow rates, flow separation occurs, leading to an increase in the diffuser loss as shown in FIG. 9, which shows a relationship between the non-dimensional flow rate and diffuser loss. As a result, the overall performance of the compressor suffers as shown in FIG. 10, which shows that at flow rates less than the design flow rate, an onset of instability is observed, and at some low flow rate, surge is produced in the system. Surge will introduce large pressure fluctuations in the pipes, and ultimately the operation of the pump becomes impossible.

The present invention was derived on the basis of the theoretical and experimental observations presented above.

A surge detection device of the present invention comprises: a sensor attached to a turbomachine or a pipe for monitoring at least one operating parameter selected from a group consisting of flow rate, flow speed and pressure; and a computing processor for processing output signals from the sensor and computing fluctuations in at least one operating parameter over a measuring interval of time so as to detect an onset of surge. According to the surge detection device presented, the computing processor computes operating parameter fluctuations over a measuring interval of time in accordance with the output signals from the sensors. Because the fluctuations in the operating parameters are confirmed to be related to surge, detection of surge can be performed rapidly and accurately.

One aspect of the surge detection device is that the computing processor is provided with a predetermined surge threshold value characteristic of the turbomachine. Therefore, the threshold value can be determined individually in each installed system or as a representative value of a group of manufactured machines.

Still another aspect of the surge detection device is that the measuring interval of time is obtained as a minimum value for nullifying the effects caused by the operation of the impeller of the turbomachine. Therefore, the effects of the operating system is eliminated, and an accurate index of the onset of surge can be determined.

Still another aspect of the surge detection device is that the operating parameter fluctuations are determined in terms of a standard deviation within sampling durations given by subdividing the measuring interval of time into a smaller time unit. This technique provides the most direct index for forecasting the onset of surge.

Still another aspect of the surge detection device is that the sampling duration is determined as a maximum value for nullifying the effects caused by the operation of the impeller of the turbomachine. Therefore, the load on the computing processor can be lessened and accurate and quick detection of the onset of surge can be performed.

Still anther aspect of the surge detection device is that the computing processor is provided with an operating data inputting device to utilize the measuring interval of time and the sampling duration in the computation. Therefore, computation is significantly facilitated.

Still anther aspect of the surge detection device is that the computing processor computes a ratio of a current flow rate to an operating parameter fluctuation for determining the operating condition of the turbomachine. Therefore, surge can be determined more precisely without failure An application of the surge detection device to a turbomachine is embodied in a turbomachine having variable guide vanes comprising: an impeller for imparting energy to a fluid medium and forwarding an energized fluid to a diffuser; diffuser vanes provided on the diffuser so as to enable altering an operating angle of the diffuser vanes; an operating parameter monitoring device for measuring fluctuations in an operating parameter provided on a machine body or on a pipe of the turbomachine; a computing processor for determining fluctuations in the operating parameter by computing fluctuations in the operating parameter over a measuring interval of time and comparing computed fluctuations with a predetermined threshold value; and a vane angle control device for regulating the operating angle so as to alter the operating angle so that the computed fluctuations will not exceed the predetermined threshold value.

According to the turbomachine presented, surge is forecast by the computing processor computing fluctuations in the operating parameter over a measuring interval of time in accordance with the output signals from the sensors, and comparing the measured value with a predetermined threshold value. The parameter fluctuations are an effective index of forecasting the onset of surge, and based on the comparison result, the computing processor regulates the operating angle of the diffuser vanes so as to maintain the parameter fluctuations below the threshold value to prevent the onset of surge in the turbomachine.

Another aspect of the turbomachine is that the measuring interval of time is obtained as a minimum value for nullifying the effects caused by the operation of the impeller of the turbomachine. Therefore, the effects of the operating system is eliminated, and an accurate index of the onset of surge can be determined.

Still another aspect of the turbomachine is that the operating parameter fluctuations are determined in terms of a standard deviation within sampling durations given by dividing the measuring interval of time into a time unit. This technique provides the most direct index for forecasting the onset of surge.

Still another aspect of the turbomachine is that the sampling duration is determined as a maximum value for nullifying the effects caused by the operation of the impeller of the turbomachine. Therefore, the load on the computing processor can be lessened and accurate and quick detection of the onset of surge can be performed.

Still anther aspect of the turbomachine is that the computing processor is provided with an operating data inputting device to utilize the measuring interval of time and the sampling duration in the computation. Therefore, computation is significantly facilitated.

Still another aspect of the turbomachine is that the vane angle control device regulates the operating angle of the diffuser vanes so as to alter a flow rate through the turbomachine by regulating an opening of one or both an suction valve or a discharge valve.

Still another aspect of the turbomachine is that the vane angle control device regulates a tip speed of the impeller so that fluctuations in the operating parameter would not exceed the predetermined threshold value.

The performance of the turbomachine of the present invention presented above is further improved by the adoption of a diffuser vane driving device comprising: a plurality of gears each engaged with a diffuser vane; a large gear engaged with each of the plurality of gears; a plurality of gear retaining members for retaining the gears and large gear in place; and a plurality of rollers for supporting the outer periphery of the large gear.

According to the diffuser vane driving device, the operating angle of the plurality of blades can be altered simultaneously thereby facilitating the operation of the turbomachine. The large gear is supported by the rollers disposed on the outer periphery of the large gear, therefore, the assembly of the device is facilitated, and any slack in the assembly can be compensated by the assembly structure.

Still another aspect of the diffuser vane driving device is that the large gear is provided with inner and outer teeth, and the large gear is engaged with the small gear operatively connected to the actuator. The simple construction of the gear arrangement facilitates reliable transmission of driving power to the diffuser vanes.

BRIEF DESCRIPTIONS OF THE DRAWINGS

Figure 8:
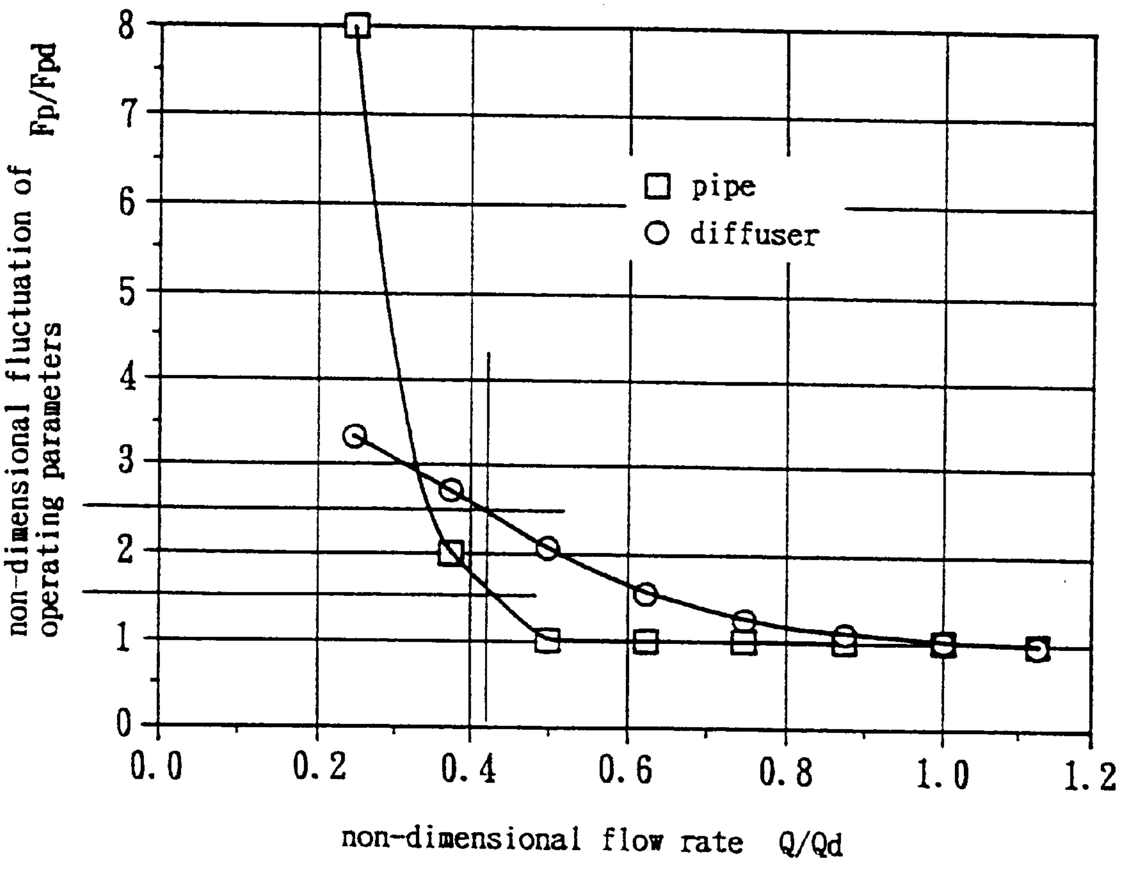

FIG. 8 presents experimental results for a method of determining a threshold value.

Figure 9:
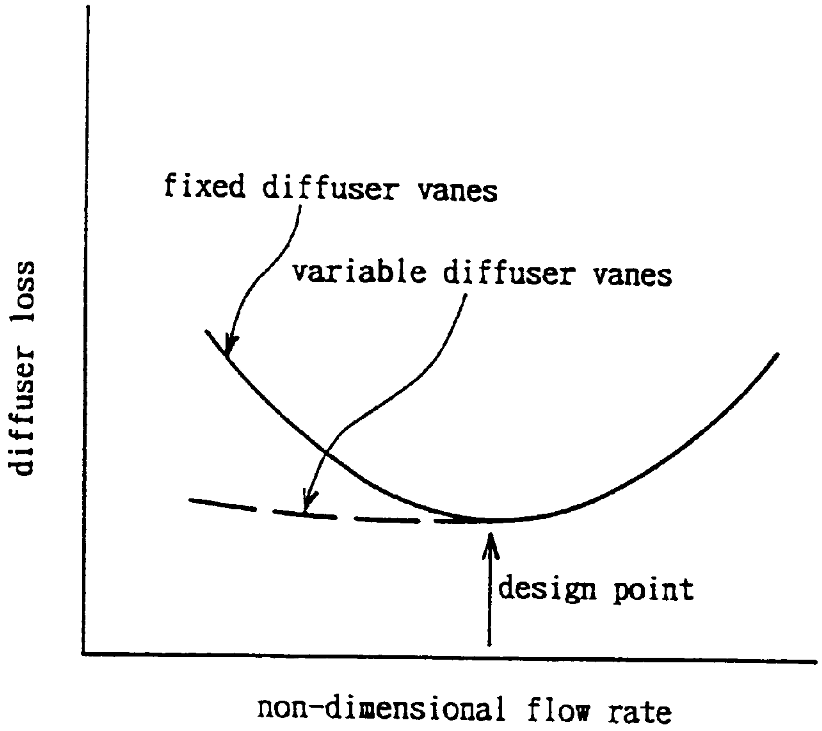

FIG. 9 is a schematic representation of a relationship between non-dimensional flow rate and the diffuser loss.

Figure 10:
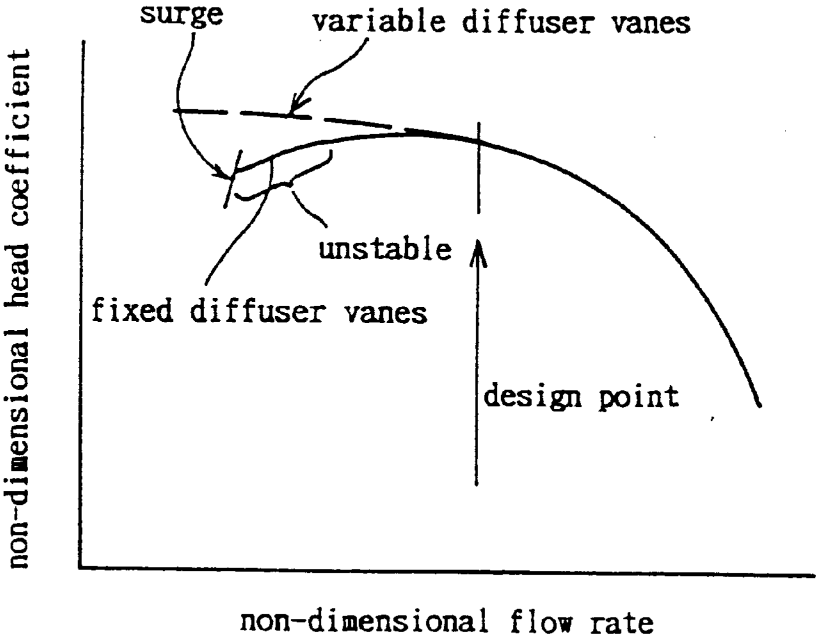

FIG. 10 is a schematic representation of a relationship between non-dimensional flow rate and the head coefficient.

Figure 11:
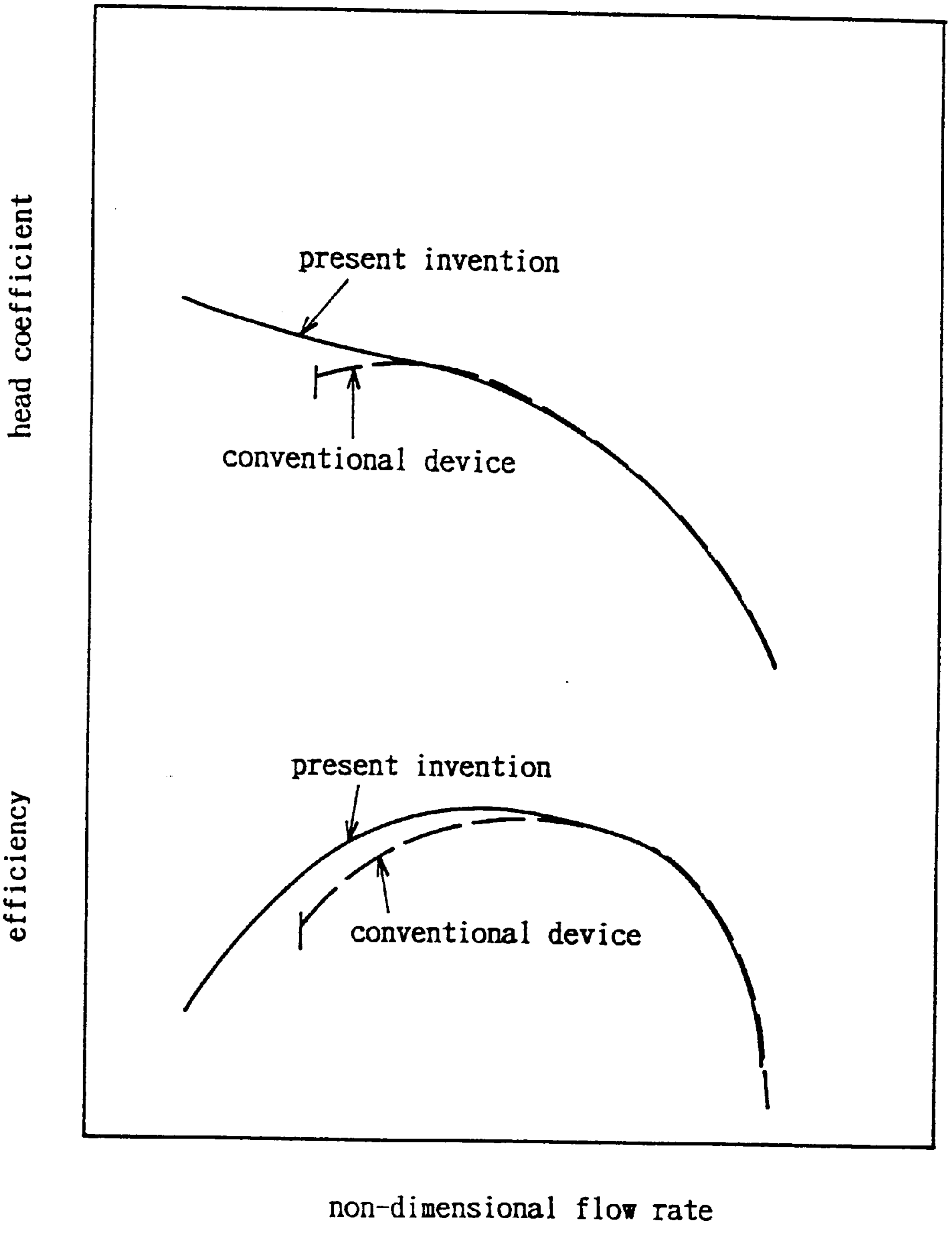

FIG. 11 is a schematic comparison of the overall performance of a compressor having a conventional surge detection device and a compressor provided with the surge detection device of the present invention.

Figure 12:
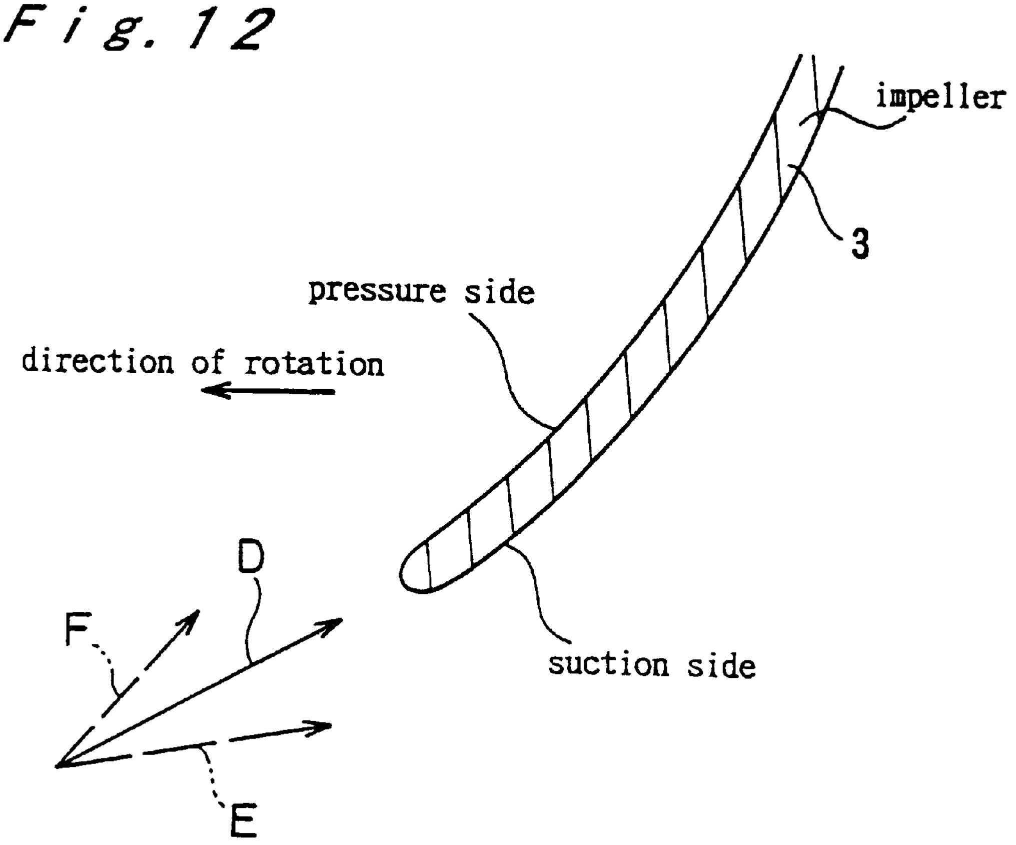

FIG. 12 is a schematic representation of the fluid flow in the vicinity of the inlet of the impeller.

Figure 13:
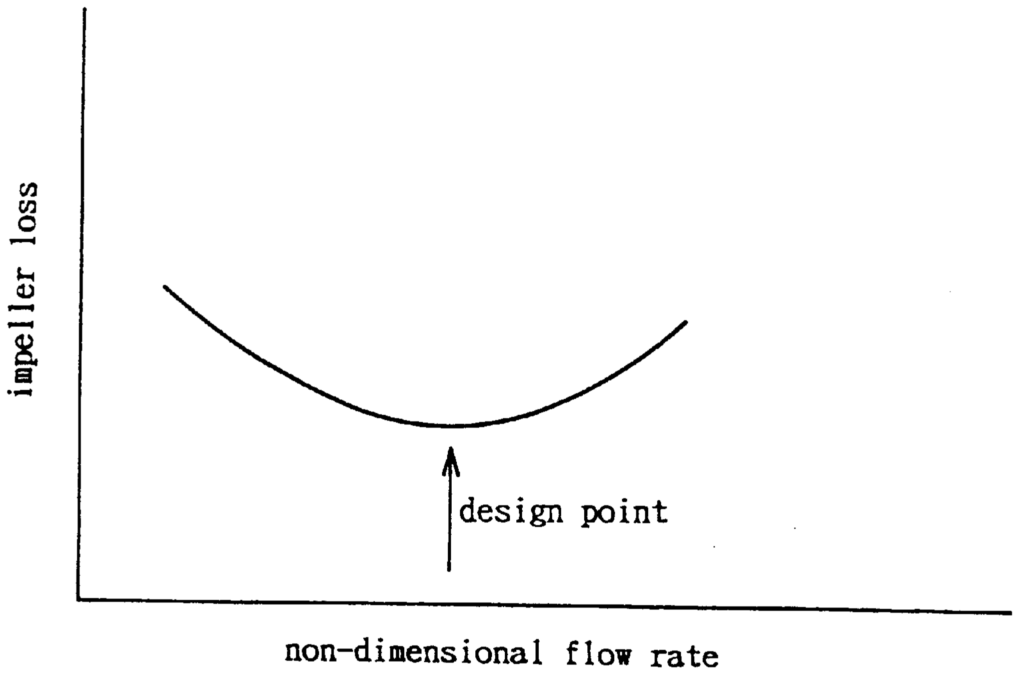

FIG. 13 is a schematic representation of a relationship between the non-dimensional flow rate and the impeller loss.

Figure 14:
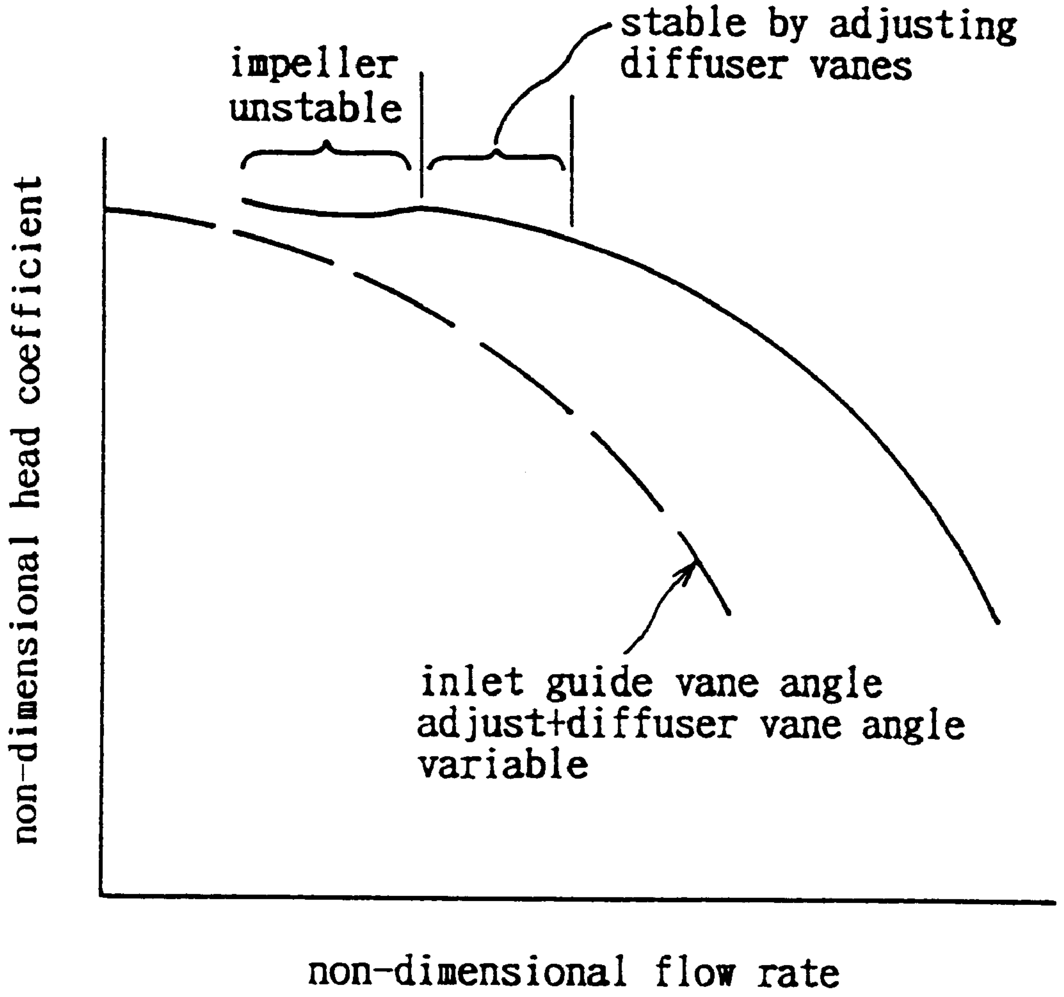

FIG. 14 is a schematic representation of a relationship between the non-dimensional flow rate and the non-dimensional head coefficient.

Figure 15:
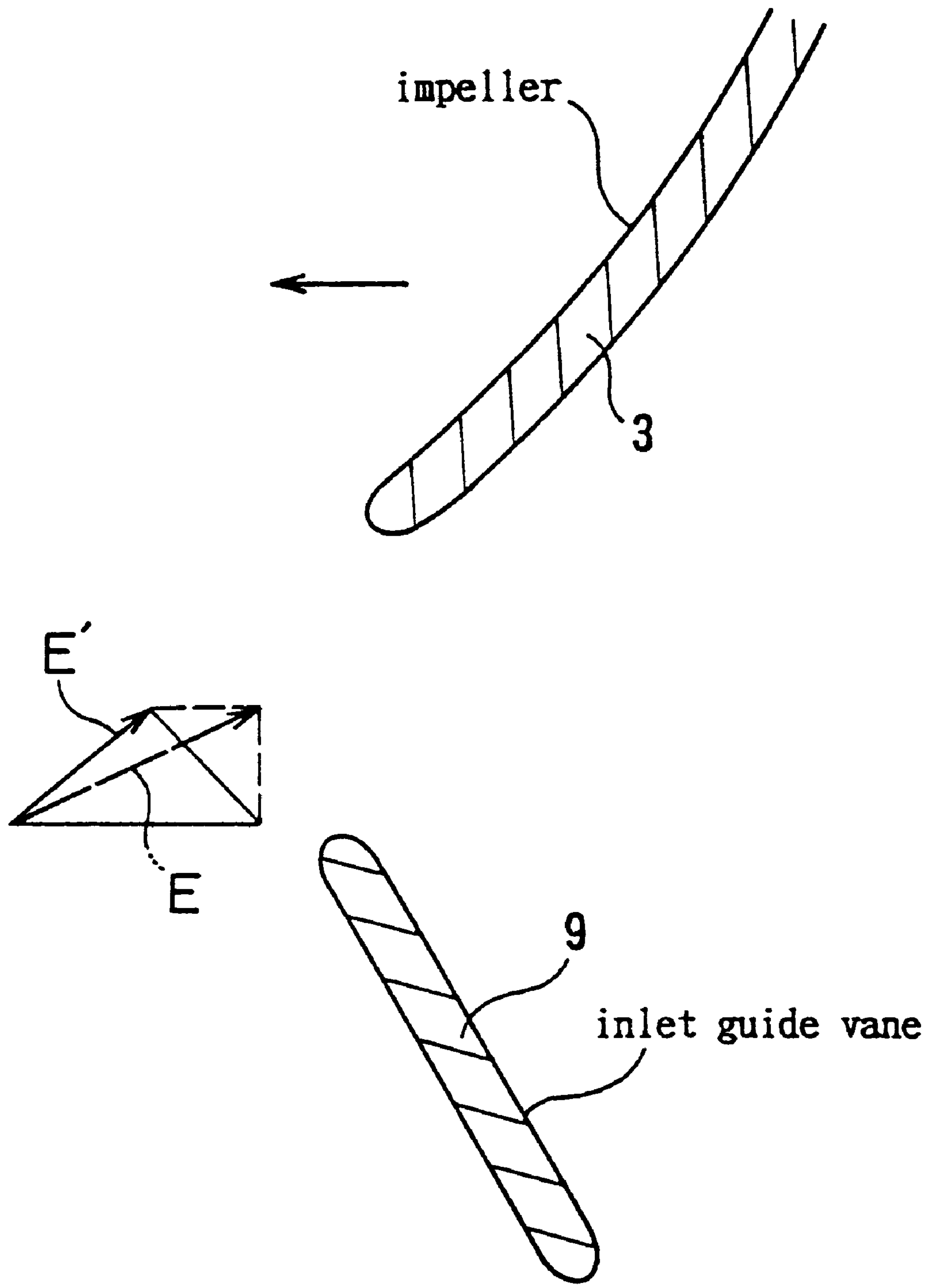

FIG. 15 is a schematic illustration of a second embodiment showing a relationship of the inlet guide vane 26 and flow directions from the vane.

Figure 16:
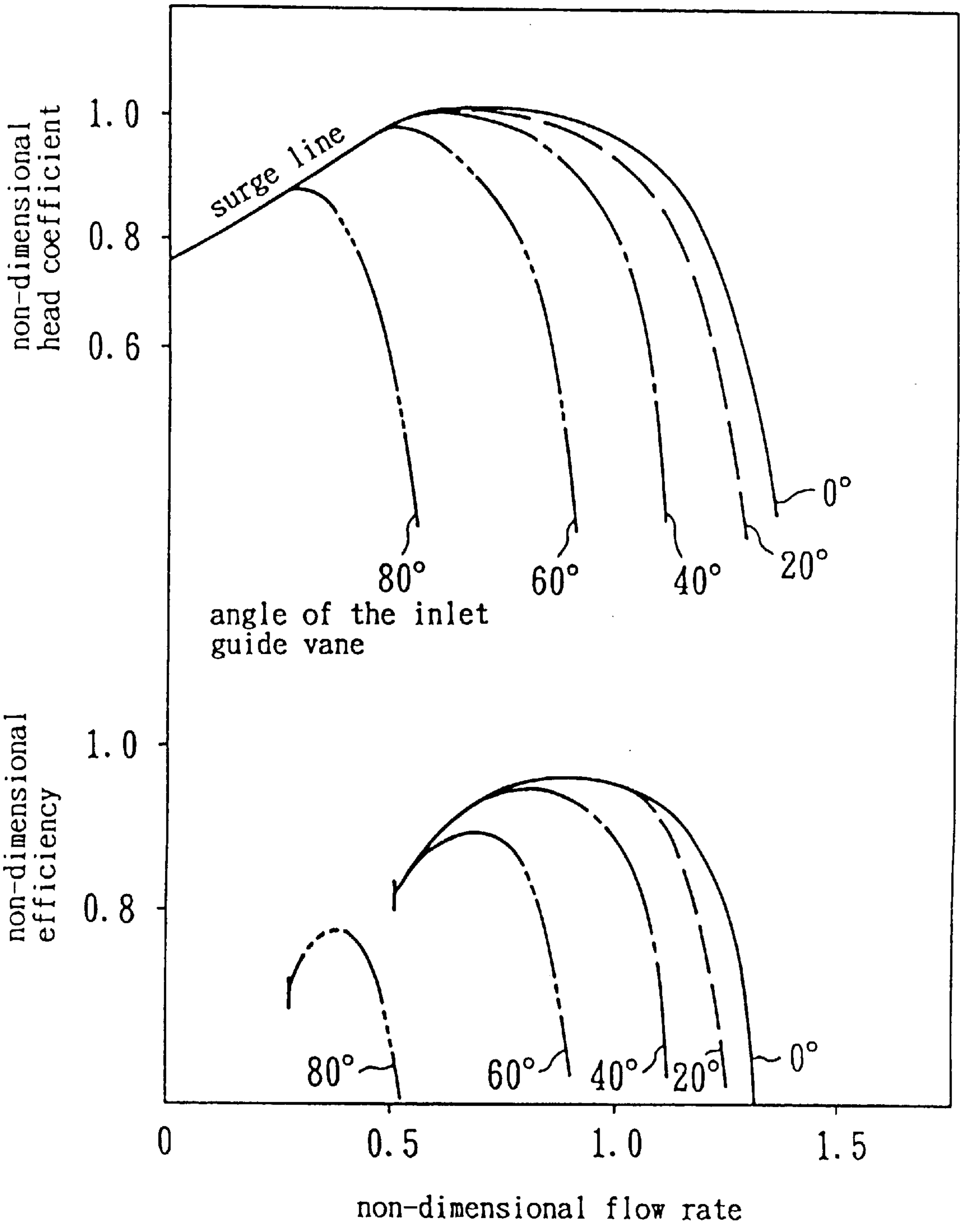
Fig. 16 (PRIOR ART)

FIG. 16 shows the performance curve of a conventional compressor.

Figure 17:
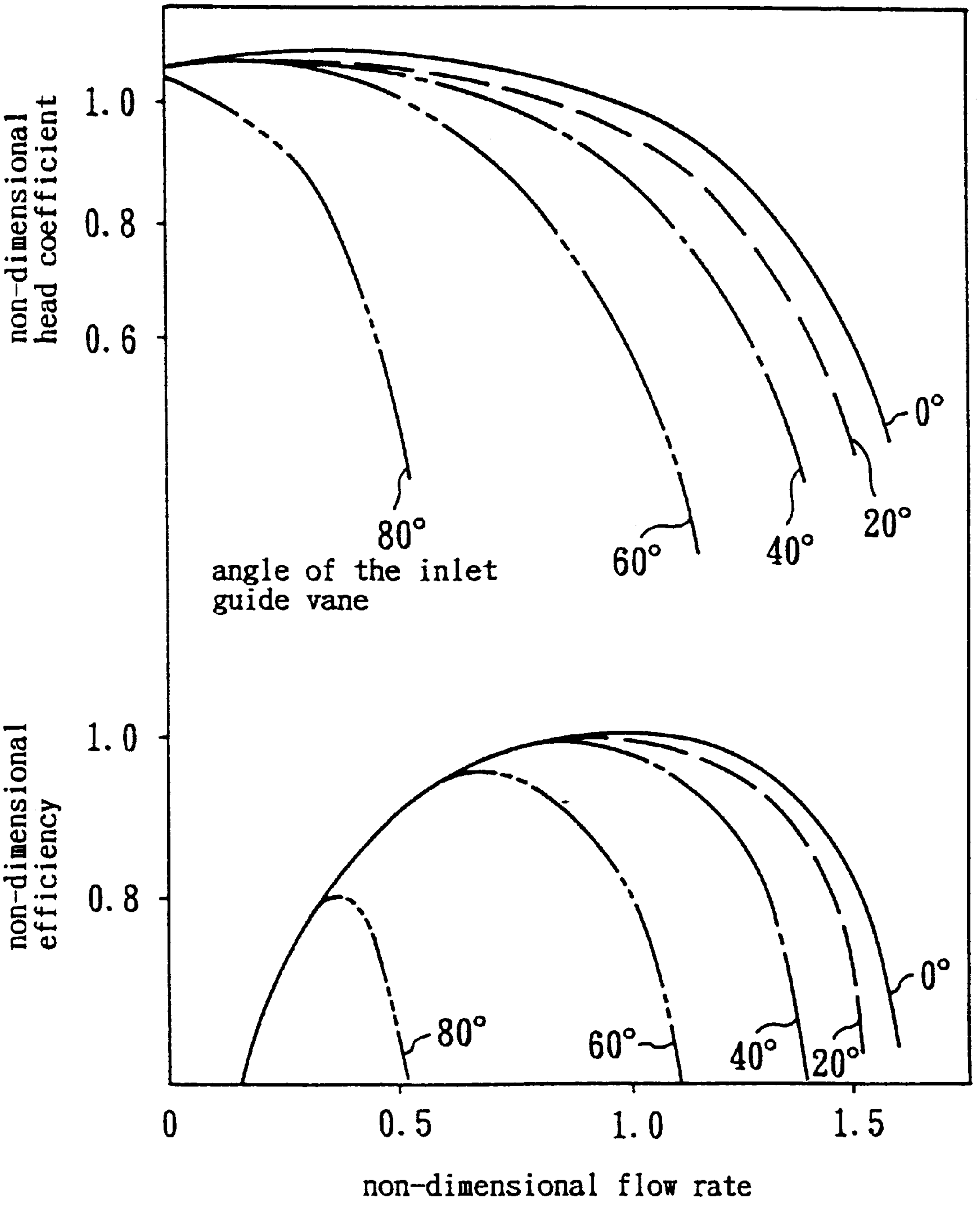

FIG. 17 shows the performance of the second embodiment of the compressor of the present invention.

Figure 18B:
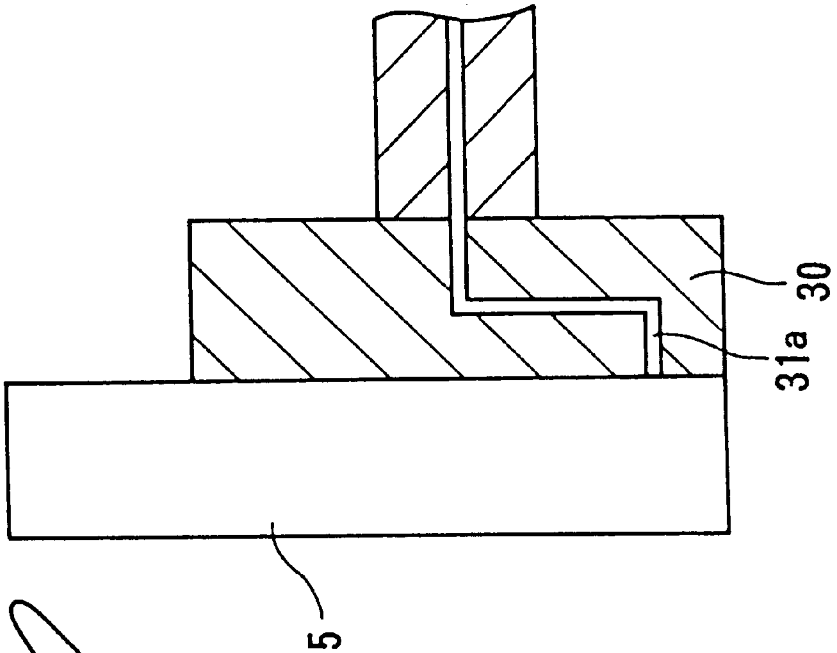
Figure 18A:
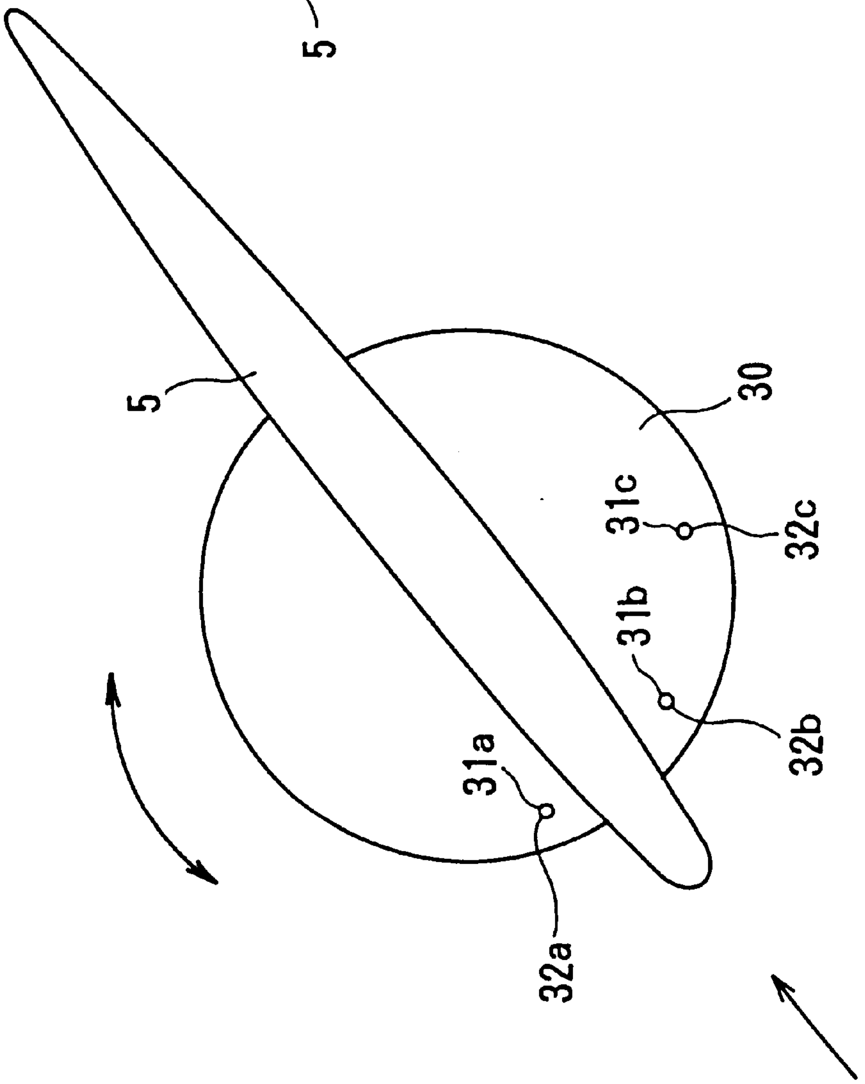

FIG. 18 shows a location of the pressure sensor in a third embodiment of the turbomachinery of the present invention, seen in a front view in (a) and a cross sectional view in (b).

Figure 19:
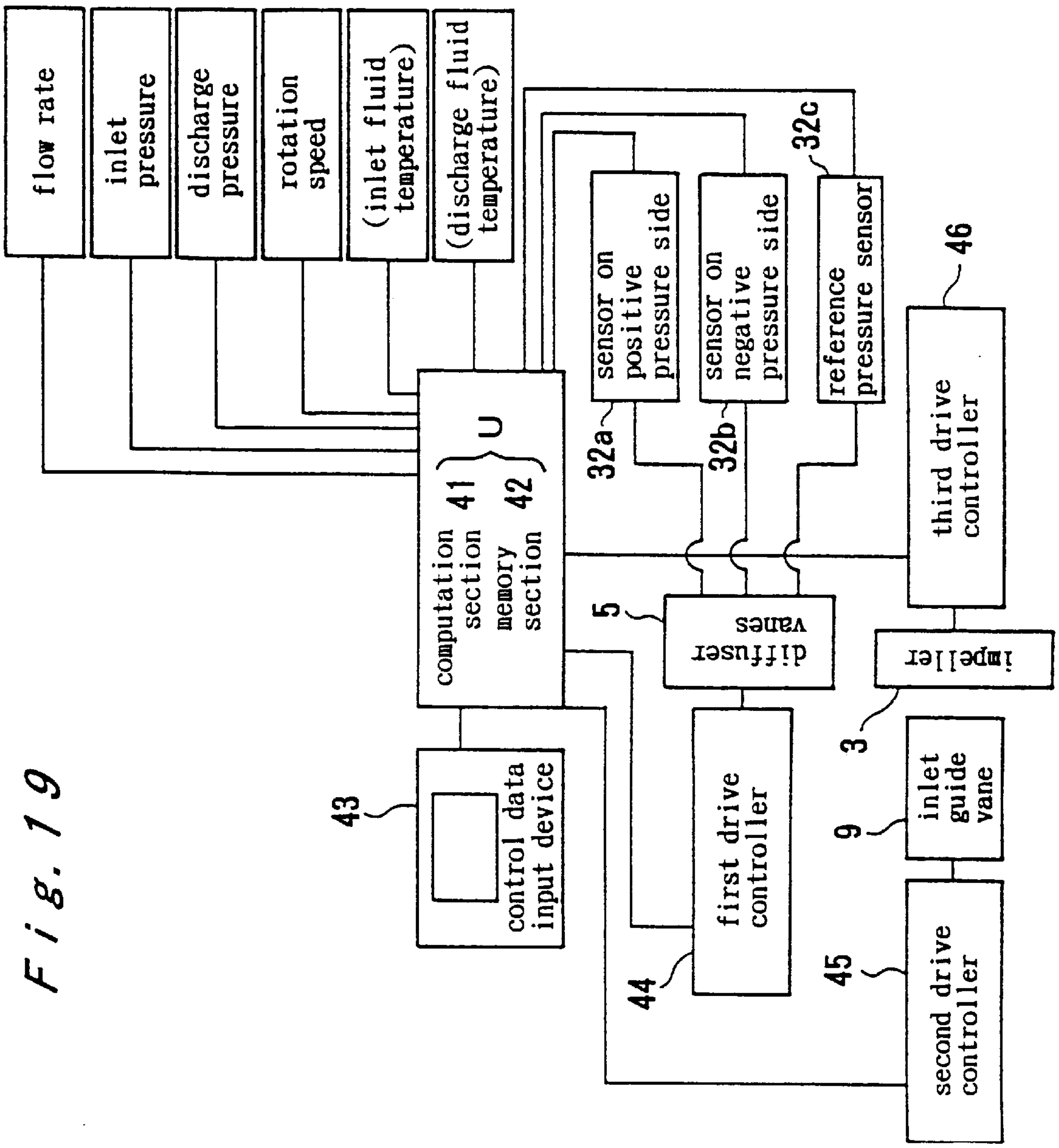

FIG. 19 is a block diagram of the configuration of the third embodiment.

Figure 20:
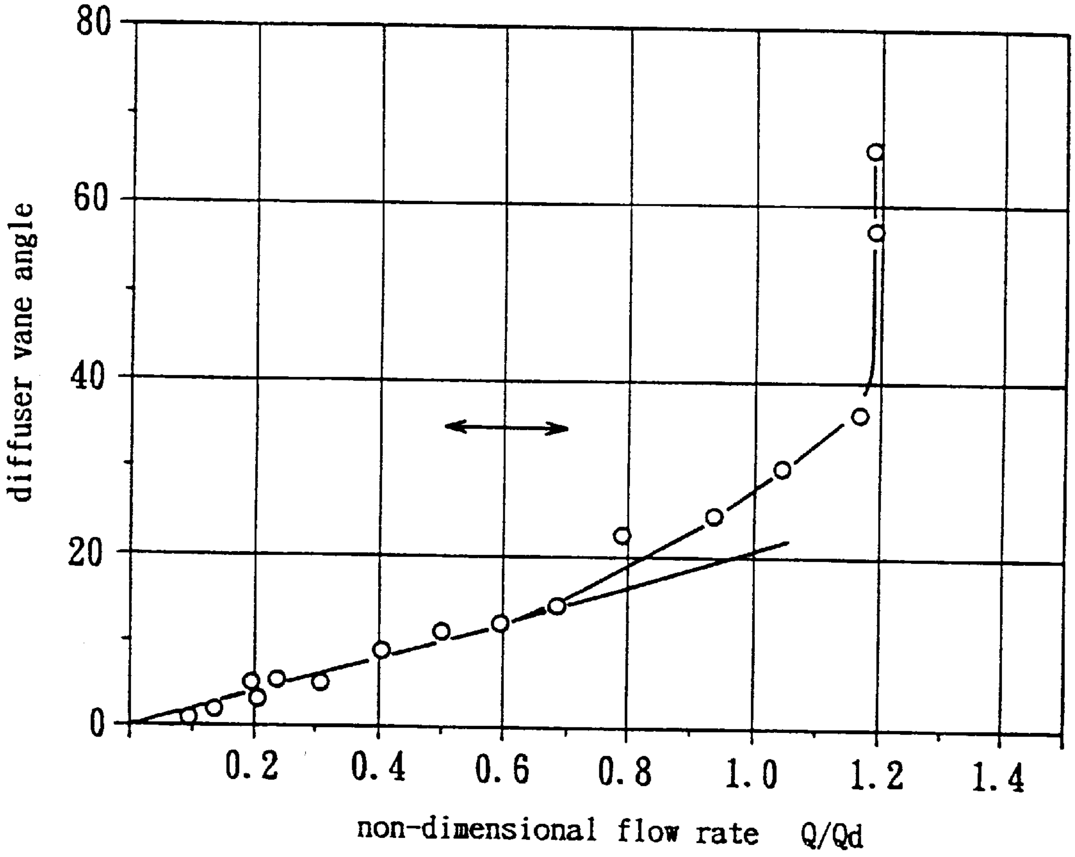

FIG. 20 shows a relationship between the non-dimensional flow rate and the diffuser vane angle.

Figure 21:
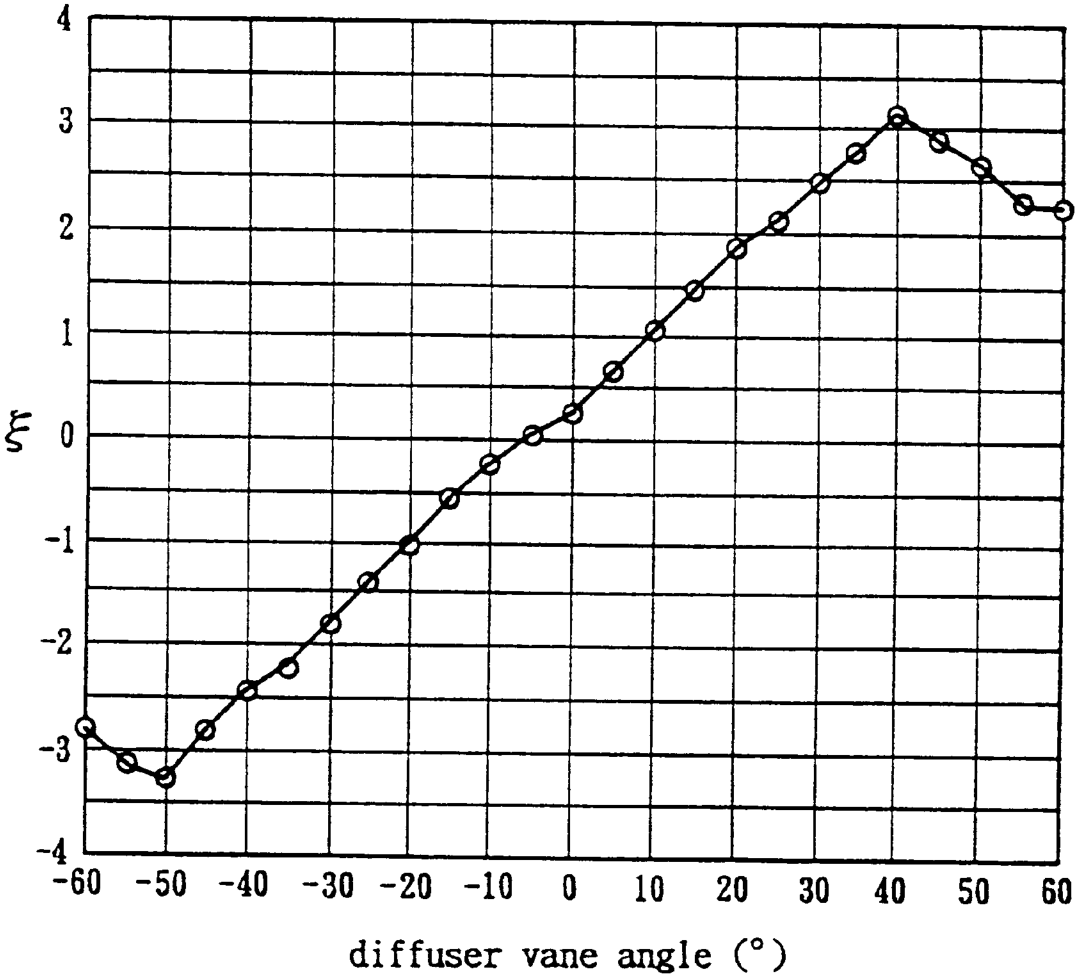

FIG. 21 is a graph showing $\xi$ and the flow angle predetermined in a test set-up.

Figure 22:
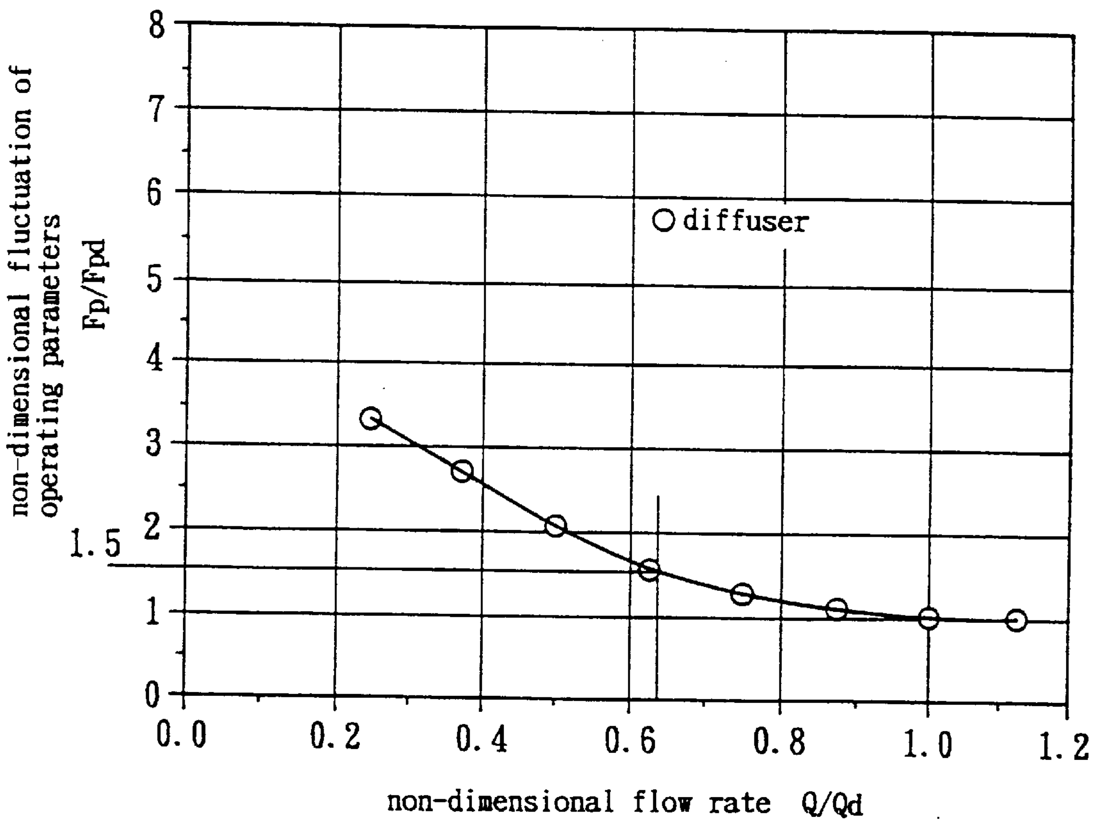

FIG. 22 is a graph showing a method of obtaining the threshold value of the turbomachine of the third embodiment having variable guide vanes of the third embodiment.

Figure 23:
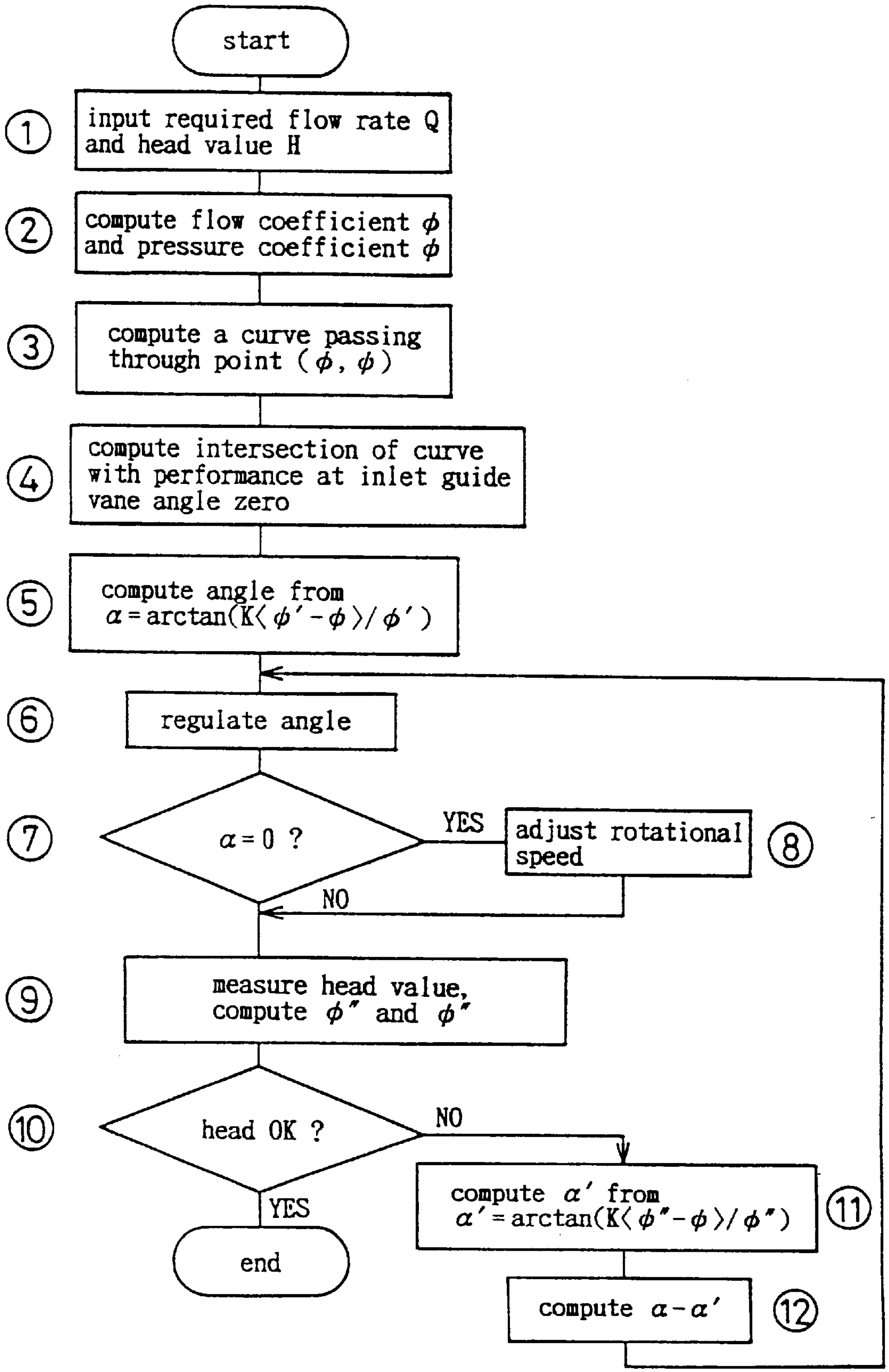

FIG. 23 is a processing step flow chart for the turbomachine of the present invention.

Figure 24:
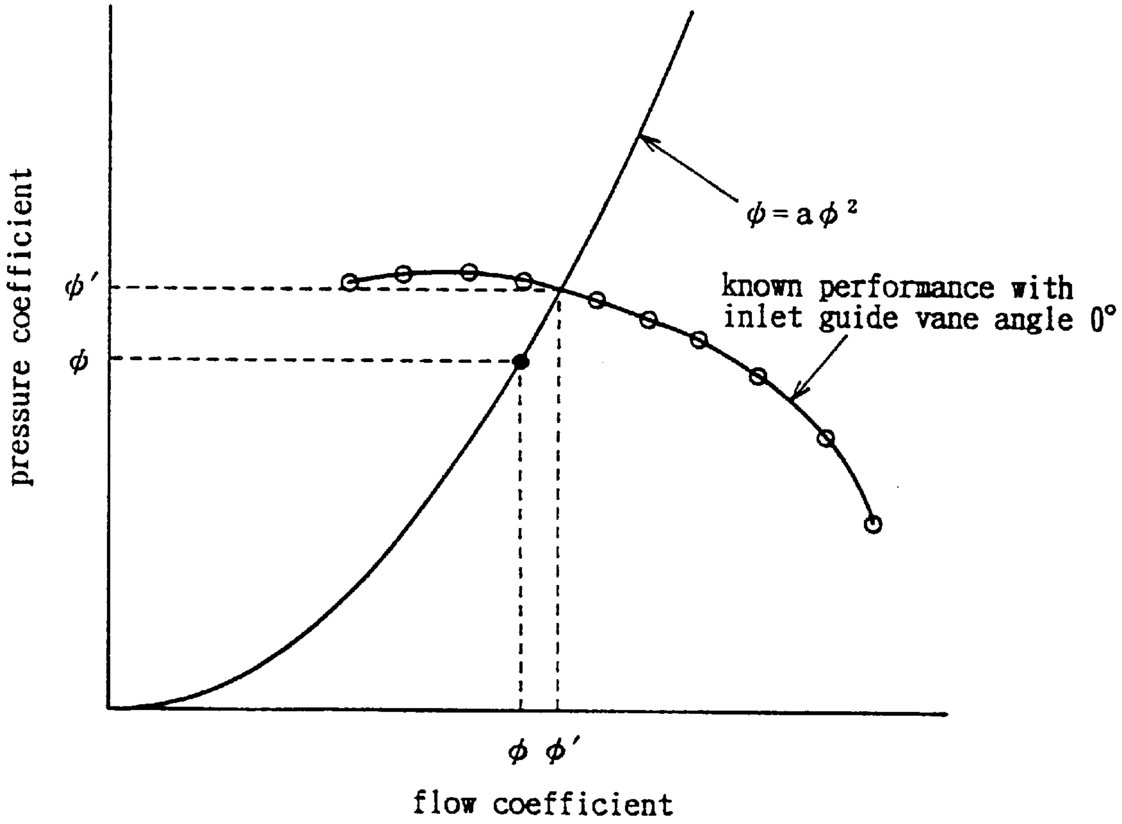
Figure 25A:
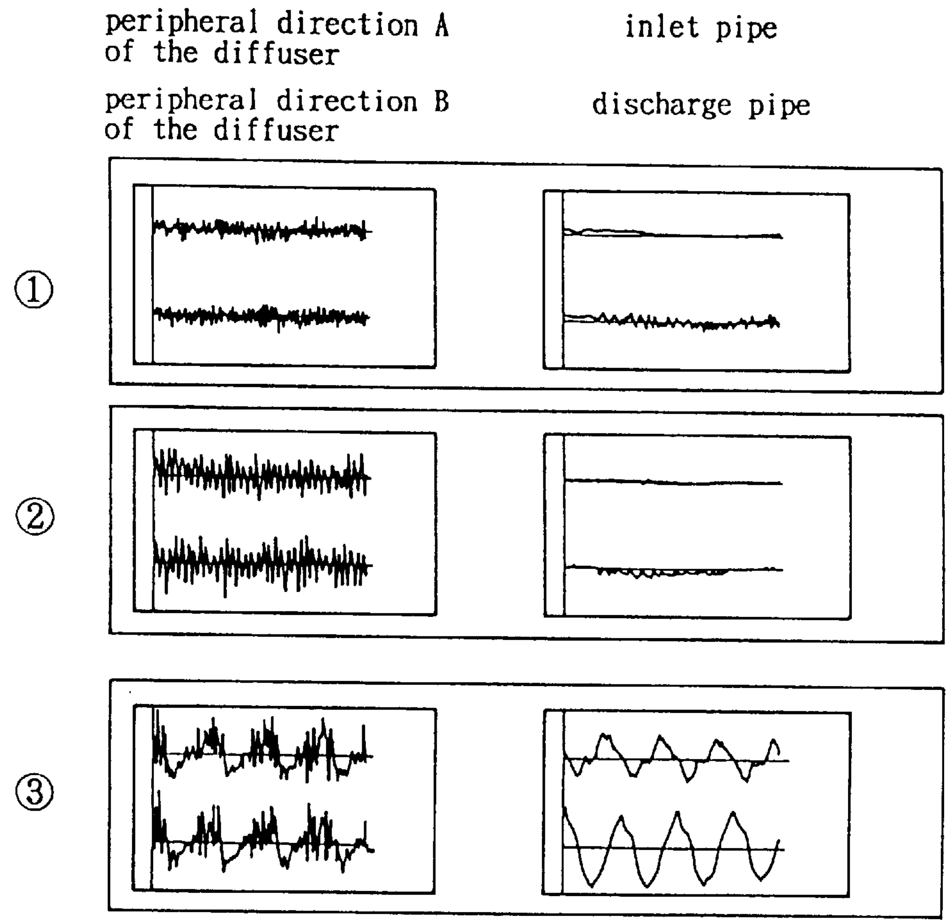
Figure 25B:
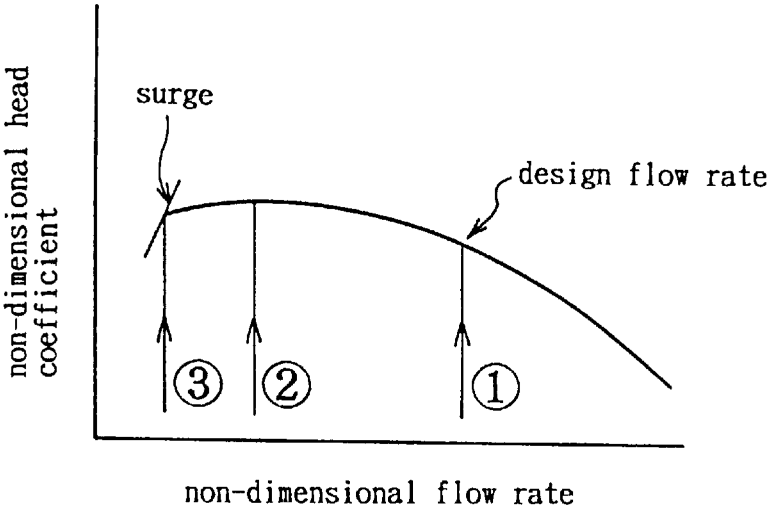

FIG. 24 is a graph presenting an operating characteristics of the pump and the system resistance curve FIG. 25 shows examples of pressure fluctuations in the system.

Figure 26:
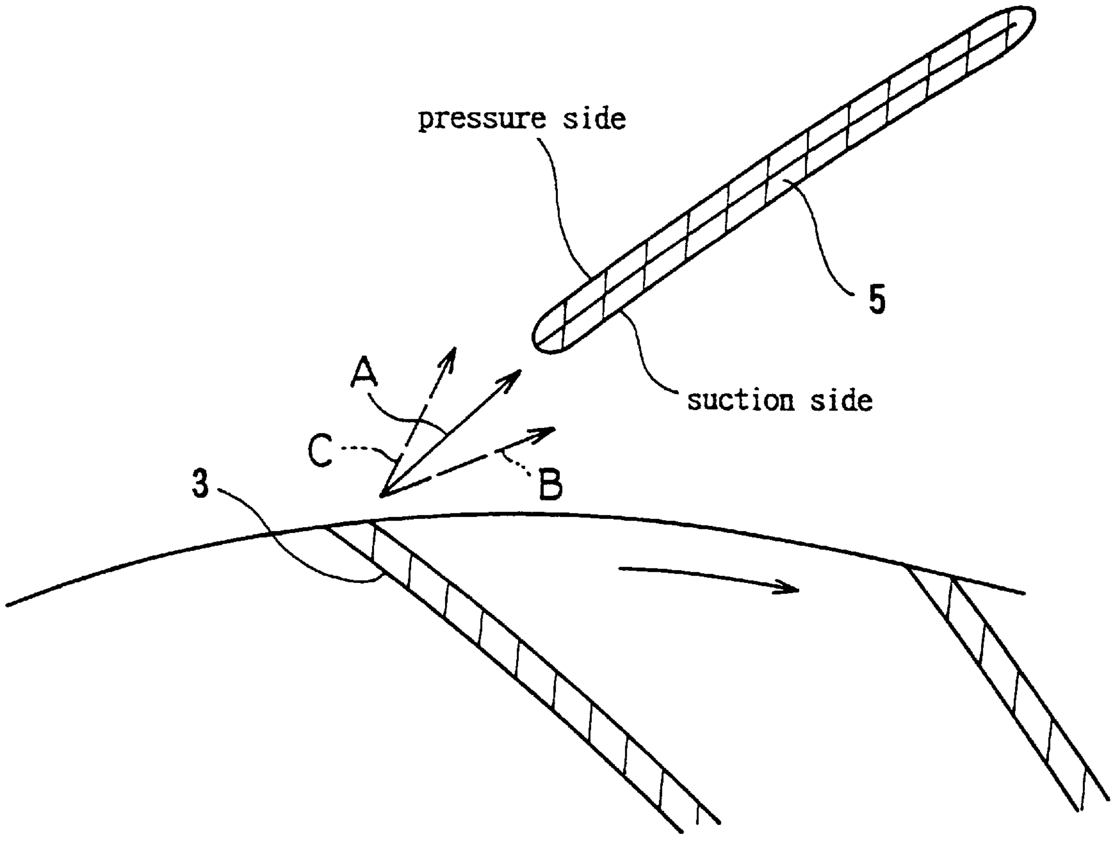

FIG. 26 is a schematic representation of fluid flow in the vicinity of the exit of the impeller.

DESCRIPTION OF THE PREFERRED EMBODIMENTS

In the following, a first embodiment of surge detection device of the present invention will be explained with reference to the drawings.

FIGS. 1 to 4 show an application of the surge detection device of the present invention to a single stage centrifugal compressor. A cylindrical casing 1 has a freely rotatable impeller 3 mounted on a rotation shaft 2. A diffuser 4 with variable-angle diffuser vanes 5 (shortened to diffuser vanes 5 hereinbelow) guides to pressurize the fluid from the impeller 3 to a scroll 6 and leads to a discharge pipe 7. Inlet guide vane 9 disposed upstream of the suction pipe 8 at the entrance to the impeller 3 are used to adjust the flow rate by altering the opening of the guide vanes 9.

Figure 1:
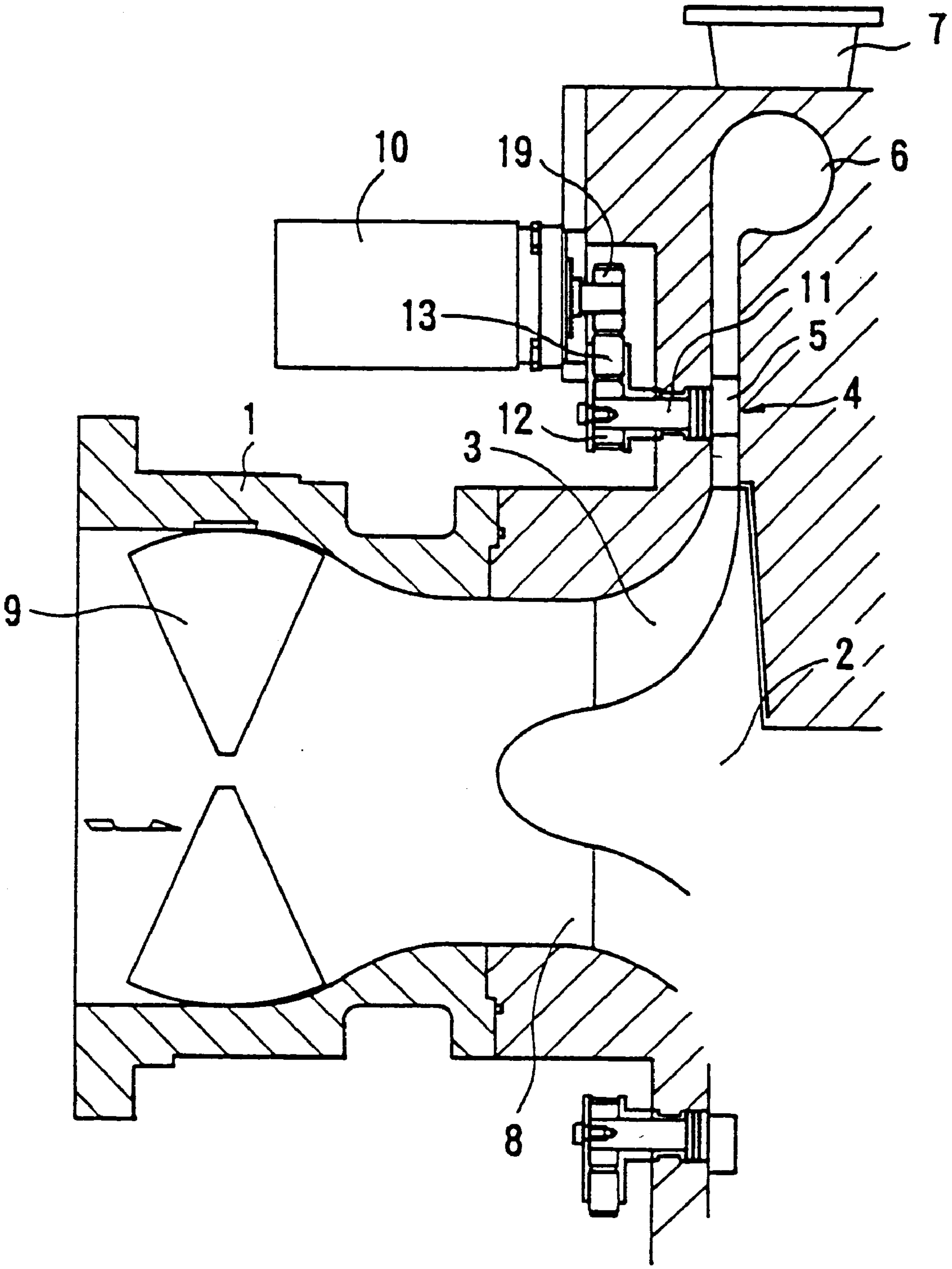
FIG. 1 shows a cross-sectional side view of a single stage centrifugal compressor provided with a surge detection device of the present invention.
Figure 2:
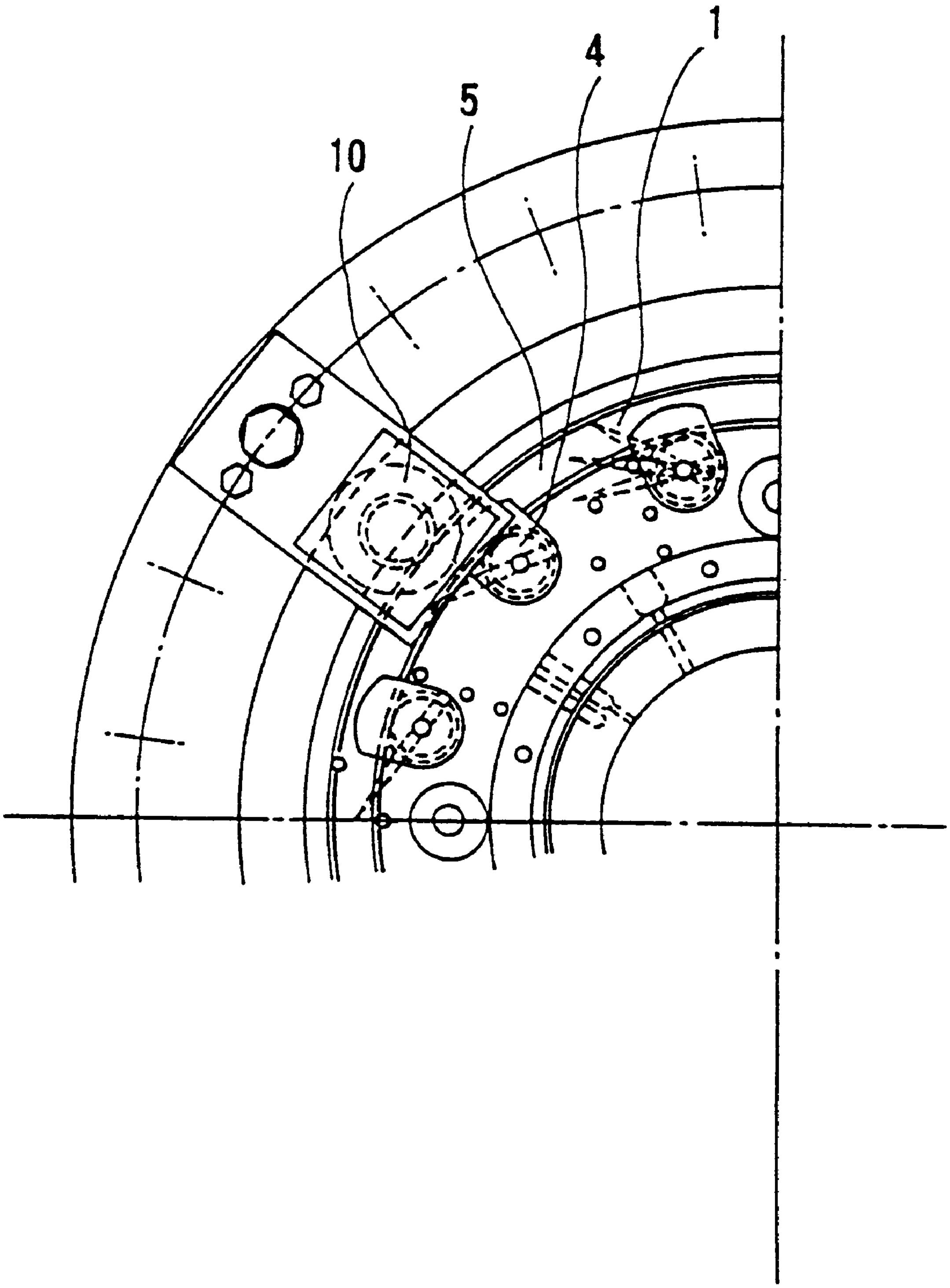
FIG. 2 is a partial side view of the surge detection device.
Figure 3:
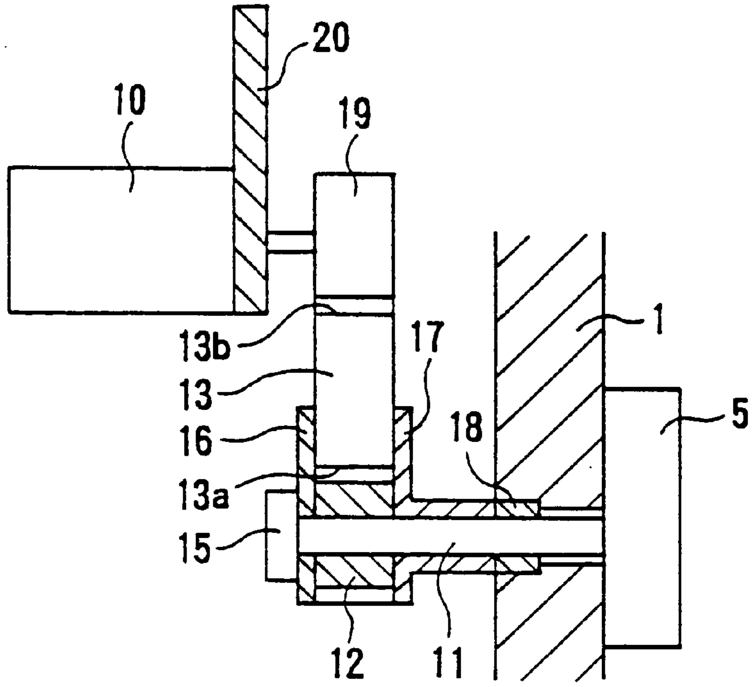
FIG. 3 is a cross-sectional side view showing the details of the attachment of the diffuser vane control device shown in FIG. 1.
Figure 4:
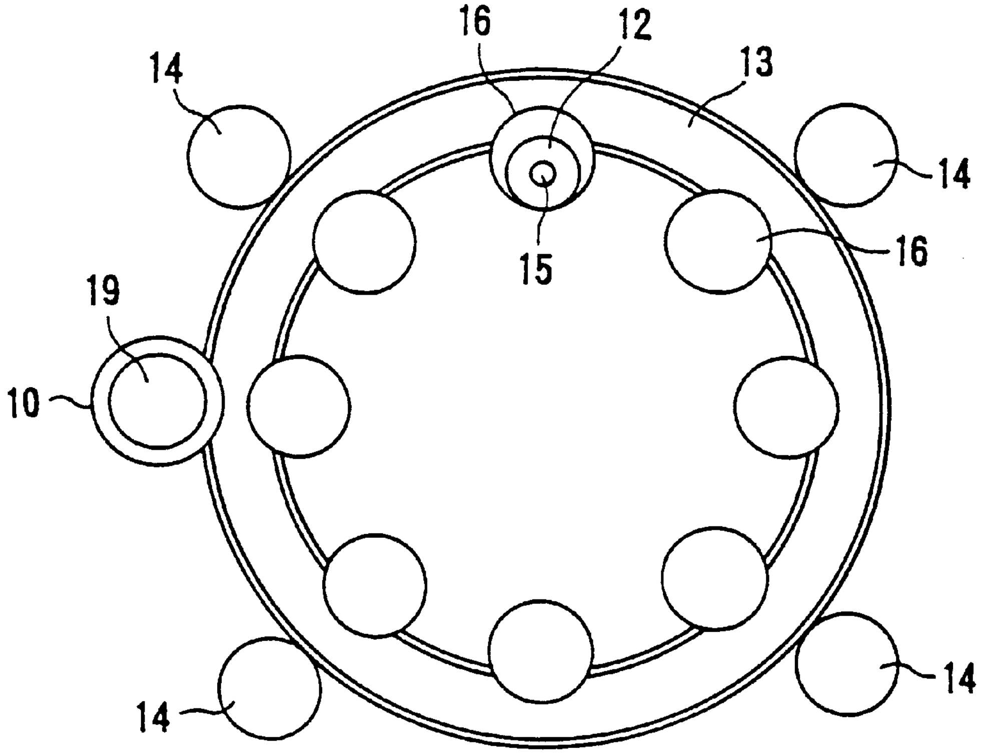
FIG. 4 is a side view of the diffuser vane control device shown in FIG. 3.

The diffuser vanes 5 of the diffuser 4 disposed downstream of the impeller 3 are operatively connected to an actuator 10 through each of a plurality of gears 12, as shown in FIG. 3, so that each vane angle can be altered. That is, as shown in more detail in FIG. 3, each of the diffuser vanes 5 is operatively connected to a gear 12 through a shaft 11. As shown in FIG. 4, each of the gears 12 is engaged with an inner gear 13*a* of a large ring gear 13, which is supported at its circumferential periphery with rollers 14 which enable the large gear 13 to rotate. This configuration of the gear assembly facilitates assembling of the diffuser vanes and the control components, and provides sufficient support to the large gear 13 while safely absorbing any slack in the assembly. A nut 15 fixes the shaft 11 in place.

As shown in the cross-sectional view in FIG. 3, two gear retainer members 16, 17 are provided to prevent the large gear 13 and each of the gears 12 engaged with the diffuser vanes 5 from falling out. A sliding member 18 is disposed between the outer surface of the gear retainer member 17 and the casing 1 to ensure smooth rotation.

Outer teeth 13*b* of the large ring gear 13 are engaged with a small gear 19 for driving the diffuser vanes 5. By operating the actuator 10, the small gear 11 is rotated to rotate the large gear 13 to drive each of the gears 12 to alter the vane angle of the diffuser vanes 5. The actuator 10 is mounted through a base plate 20.

Figure 5:
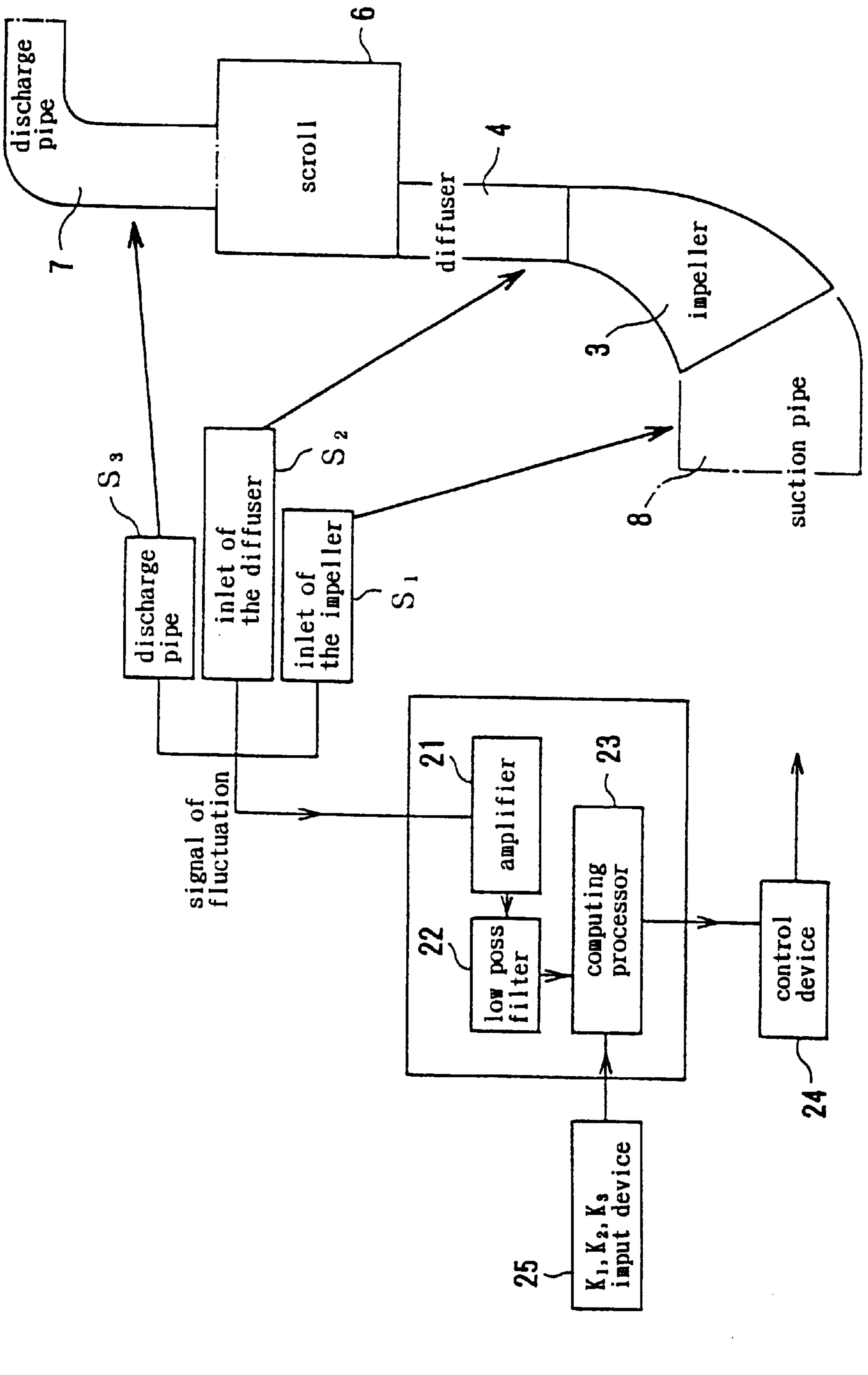
FIG. 5 is a block diagram of the surge detection device and the locations of sensors in the turbomachine.

FIG. 5 is a block diagram for the surge detection device and shows the locations of the sensors (pressure sensors in this embodiment) attached to either a pump body or to pipes so as to monitor one or all of the parameters, such as flow rate, flow speed, pressure. Specifically, for example, sensor $S_1$ is disposed on suction pipe 8, sensor $S_2$ are disposed at two locations at the entrance to the diffuser 4 and sensor $S_3$ on discharge pipe 7.

The waveforms of the operating parameters detected by the sensors $S_1$, $S_2$ and $S_3$ are input into a signal amplifier 21, and the amplified signal from the amplifier 21 is forwarded, through a low-pass filter (LPF) 22, to a computing processor (shortened to computer hereinbelow) 23. The output signal from the computer 23 is input into a control device 24 which is provided with a control data input device 25. It is possible that the functions provided by the amplifier 21 connected to the sensors $S_1$ to S3, filter 22, input interface and the computer 23 can all be performed with a microprocessor unit.

Figure 6:
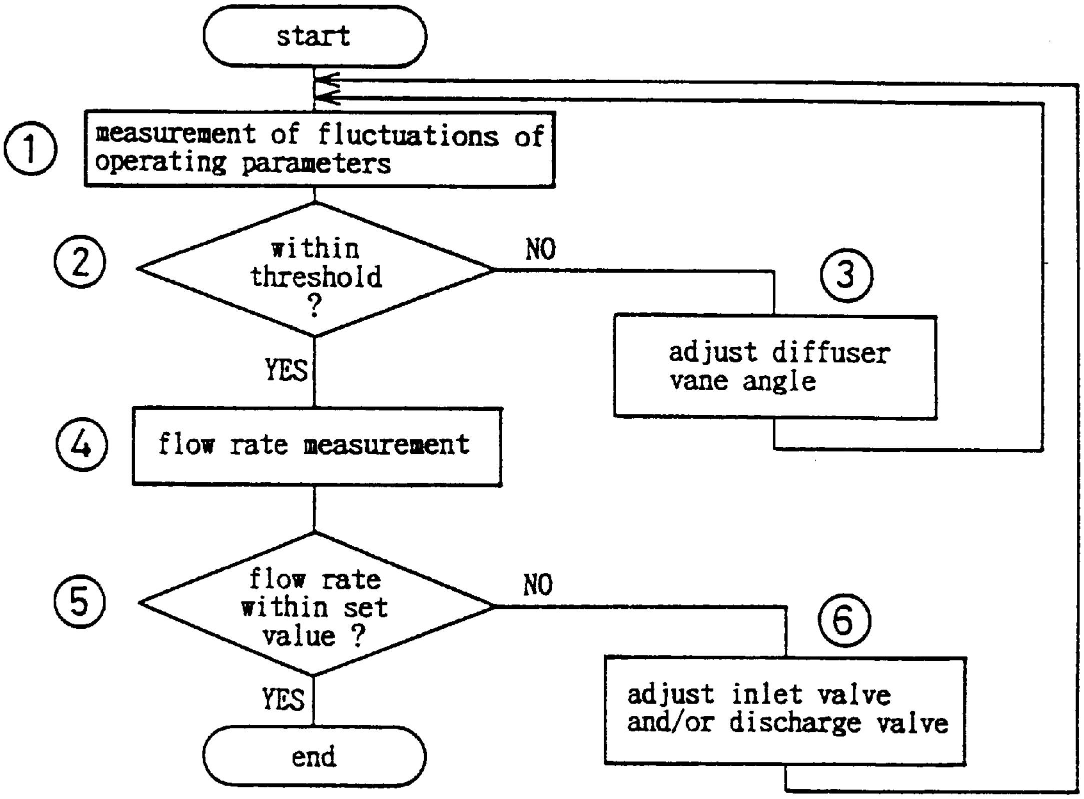
FIG. 6 is a flow chart showing the processing steps for controlling surge.

FIG. 6 is a flow chart showing the control protocol of the computer 23 and the control device 24. In step 1, sensors $S_1$ to $S_3$ perform measurements of fluctuations in the operating conditions, and in step 2, the fluctuations during the measuring interval of time T are computed and compared with a threshold value, and when the fluctuations are higher than the threshold value, diffuser vane angles are adjusted in step 3. This is accomplished by activating the actuator 10, thereby rotating the small gear 19 and the large gear 13 to drive the gear 12 to rotate the diffuser vane 5 to change the diffuser vane angle.

Figure 7:
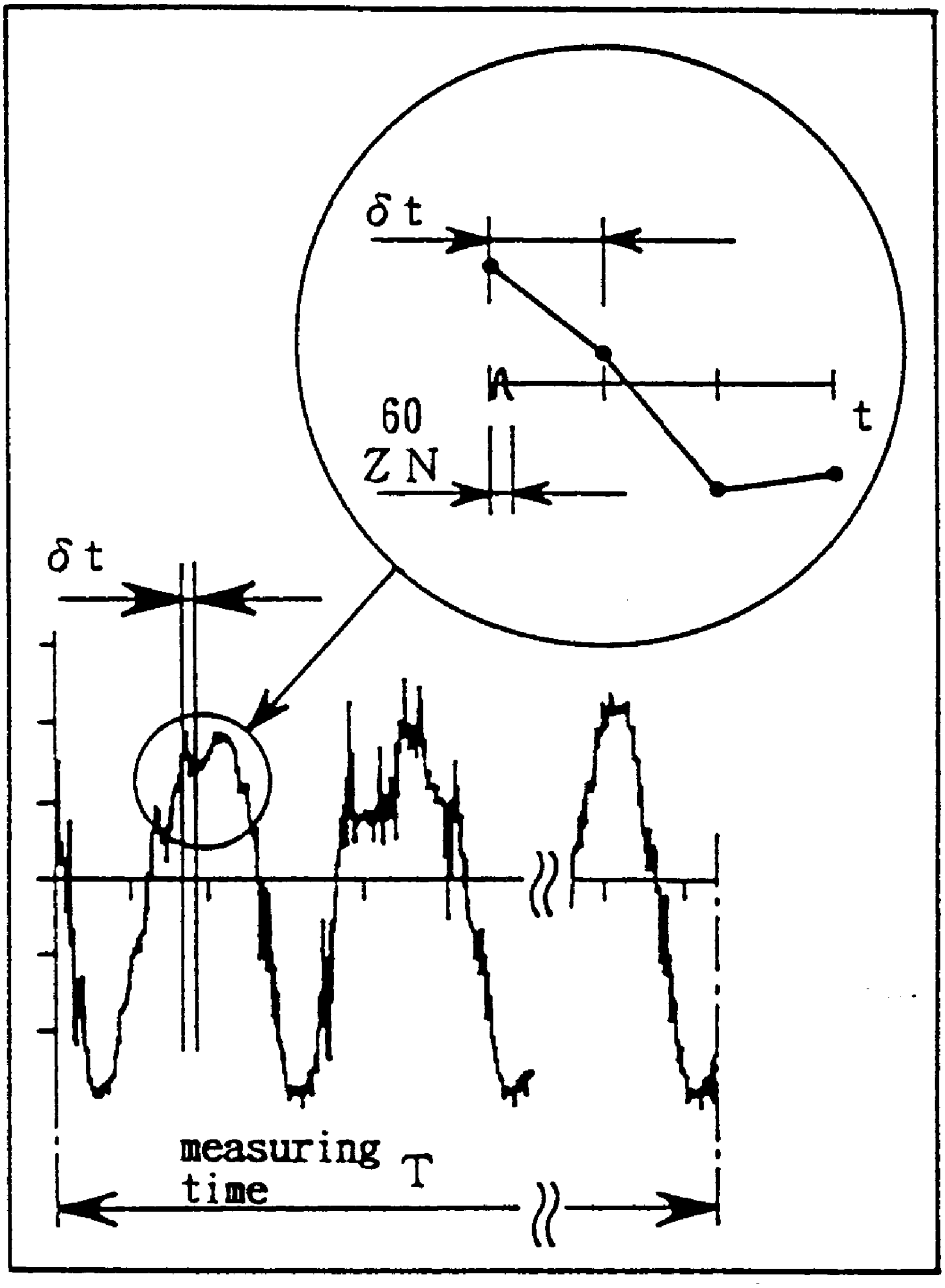
FIG. 7 is a graphical representation of a method of determining the measuring time and the sampling duration in relation to details of parameter fluctuations shown in a circled space.

The basis of the above computational process is a value termed Fp, and a method of computing this value will be explained with reference to FIG. 7. In this figure, T refers to an interval of time over which a fluctuation is computed, and δt is the sampling duration for the pressure parameter Pi (Q, t) which forms the basic computational process for the fluctuations in the operating parameters of the system. The fluctuation in the flow rate Fp(Q) is the standard deviation per unit time measured over a measuring interval of time T at the sampling duration δt, and is given by the following equation, $$Fp(Q)=[1/T\Sigma\{Pi(Q,t)-Mi(Q)\}^2]^{1/2},$$

where $Mi(Q)=1/T\Sigma Pi(Q,t)$

The above equations are applicable to both DC data (i.e. having an offset datum line), or AC data varying above and below the zero line.

The measuring interval of time T should be sufficiently small so as to compute an index of fluctuation in the operating condition to enable accurate and quick response. In this embodiment, a guide to the measuring interval of time T is obtained by a formula 60/ZN (in seconds) where N is the rotational speed of the impeller 3 (rotation per minute) and Z is the number of blades of the impeller 3. In other words, this quantity refers to the degree of operating parameter fluctuation during a change cycle of an operating parameter, in this case, such as pressure generated by the rotation of the impeller 3. Therefore, the measuring interval of time T should be chosen so as not to be influenced by the fundamental operating characteristics of the impeller 3. The result is expressed by the following formulae $$T \geqq K_1 60/ZN$$

where T should be selected to be at the minimum limit of the value given by the above relationship, where $K_1$ is a constant given by the characteristics of the turbomachinery, and which can be determined beforehand at the time of testing the turbomachine, or if the machine of the system is a high volume production unit, then a representative value should be entered in the control data input device 25.

Next, a method of determining the sampling duration, δt, will be presented This quantity is desirable to be as short as possible from the viewpoint of computing an accurate index of the control constant, however, excessively short sampling duration will load the computer, and the computation time becomes undesirably excessive. In this embodiment, a guide to the sampling duration δt is again calculated on the basis of the formula 60/ZN (in seconds). Therefore, the sampling duration δt should be chosen so as not to be influenced by the fundamental operating characteristics of the impeller 3. The result is again expressed by the following formula:

$$\delta t \geqq K 60/ZN.$$

Furthermore, because the vibrational periods are dependent on the flow rates as explained above, therefore, the sampling duration must be chosen appropriately for different flow rates. In this embodiment, the sampling duration is determined in the instability region of flow rate 2 by $K_2$60/ZN; and in the surge region of flow rates 3 by $K_3$60/ZN. These constants $K_2$ and $K_3$ are dependent on the type of turbomachine, and as in the case of $K_1$, can be determined beforehand at the time of testing the turbomachine, or if the machine of the system is a high volume production unit, then a representative value should be entered in the control data input device 25.

The operating parameters of the compressor are determined for every operating system as described above, but the onset of instability, i.e., surge threshold value Y for the operating system, is determined as explained in the following.

Experimental results in terms of non-dimensional pressure fluctuations and non-dimensional flow rates are shown in FIG. 8. The x-axis represents flow rates Q normalized by dividing the operating flow rate by the design flow rate Qd, and the y-axis represents operating pressure fluctuations Fp normalized by the pressure Fpd at the design flow rate Qd. In FIG. 8, the circles represent the pressure measurements obtained at the diffuser wall and the squares represents the pressure measurements obtained at the suction pipe.

The operating conditions were as follows:

N=9,000 rpm; Z=17

$K_1$=2,000; $K_2$=5; and $K_3$=20.

From these results, it can be seen that prior to reaching the surge state (represented by Fp/Fpd=8 on the non-dimensional pressure fluctuation), the pressure fluctuations begin to show a rapid increase. It is clear that the stable operation of the compressor can be achieved by maintaining the pressure fluctuation below this threshold value. In this example, Fp/Fpd=1.5 is judged to be the limit, and the threshold value Y is taken as 1.5 Fpd. It should be noted that during the operation of the compressor, even if the system is operating at the threshold value, if the trend of pressure fluctuations is decreasing with respect to the flow rate, then it can be concluded that the system is heading towards a stable operation, and surge would not be generated. It can also be programmed so that the judgement basis is based on the slope of d(Fp)/dQ which should show that if the slope is positive, surge would not be generated even if the system is operating above the threshold value Y.

The results of applying control steps 2, 3 and 4 shown in FIG. 6 to changing the angle of the diffuser vane are shown in FIG. 9. It is seen that the diffuser losses at the diffuser vane 5, in the region of flow rates less than the design flow rate, have been lowered as indicated by the broken line in FIG. 9. Consequently, the overall performance of the compressor system in the low flow region below the design flow rate has been improved as shown by the broken line in FIG. 10.

When the angle of the diffuser vane 5 is altered, the overall performance of the pump is also altered. Therefore, if adjustments of the angle to avoid surge do not produce the desired head coefficient, the rotational speed of the pump may be varied in those pumps which are provided with a required facility. In this case, appropriate judging capability should be provided in the computer 23.

When the angle of the diffuser vane 5 is altered, the operating point of the pump is also altered in some cases, causing the operating flow volume to be changed from the intended flow rate. In such a case, the openings of the suction valve and/or discharge valve can be adjusted to regulate the flow volume to produce the desired stable operation.

Returning to the flow chart in FIG. 6, when the pressure fluctuations are less than the threshold value, protocol is that the flow rate is measured in step 4, and in step 5, the flow rate is judged to be either within or outside of the operational setting, and if the actual flow rate is not within the operational setting, the openings of the suction valve and/or discharge valve are adjusted in step 6.

FIG. 11 presents a schematic comparison of the performance of the conventional pump system having a fixed diffuser vane and the pump system having the surge detection device of the present invention. It is seen that the present pump system is able to operate up to the low flow region of shut-off flow rate compared with the conventional pump system. Therefore, it is obvious that a pump system having the surge detection device is able to operate in a low flow rate region below the design flow rate without generating surge and other instability problems, thereby offering a significantly greater operating range than that achievable with the conventional pump system.

The operating parameters to be monitored may any one or more of pressure, flow rate, speed and shaft vibration. The location of the sensors is best at the diffuser but other locations such as various locations on the pump body and pipes.

It should be noted in FIG. 6 that when the fluctuation drops to a specific value below threshold value, the surge detection device can be provided with a warning capability based on sound or blinking lights.

Next, a second embodiment of the surge detection device will be presented with reference to FIGS. 12 to 17.

The instability problem of compressors can be caused not only by diffusers but also by impellers. FIG. 12 is a schematic illustration of the flow conditions near the inlet of the impeller 3. The flow directions are shown with arrows representing flow rates D (design flow rate), E (small flow rate) and F (large flow rate) As can be seen from this illustration, at flow rates other than the design flow rate, the fluid has negative incidence angle on the impeller blade at higher flow rates, and a positive incidence angle on the impeller blade at lower flow rates than the design flow rate. The angle between the flow stream and the impeller blade becomes excessive in either case, and the flow is separated from the impeller blade, and consequently, the loss at the impeller 3 increases, as indicated in FIG. 13.

Therefore, even with the variable diffuser vanes to compensate for the diffuser loss as shown the solid line in FIG. 14, an instability region, caused by the loss at the inlet of the impeller, appears in the overall performance of the pump as illustrated in FIG. 14.

To avoid the problem described, the inlet guide vane 9 angle to the impeller 3 can be adjusted to provide an inlet swirl at the inlet of the impeller 3, thus altering the inlet flow angle with respect to the impeller 3 from E to E' as shown in FIG. 15. By so doing, the exit flow from the impeller is naturally altered, and therefore, by adjusting the angle for the diffuser vane 5 accordingly, the performance shown by the broken line in FIG. 14 is obtained. The operation of the pump system becomes stable without showing any inflection point in the performance curve and it becomes possible to operate the pump system to the shut-off flow rate without generating surge.

It should be noted that by adjusting the inlet guide vane 9, the flow rate is altered, and therefore, the operating flow rate and the head coefficient must be re-determined with the computer 23, and further fine adjustments to the inlet guide vane 9 made appropriately.

When the angles of the inlet guide vane 9 and the diffuser vane 5 are altered, the overall performance of the pump system is altered. Therefore, if altering of the diffuser vane 5 does not achieve the desired head coefficient to avoid surge, the rotational speed of the pump can be altered in those pumps which are equipped with a proper facility. The regulation can be achieved by providing an appropriate judging capability to the computer.

FIG. 16 shows the overall performance curve of a pump system having fixed-angle diffuser vanes and variable-angle inlet guide vane 9. In this system, surge occurs below a certain flow rate, and the pump cannot be operated. In contrast, in FIG. 17, a pump system provided with the variable-angle diffuser vanes 5 and the inlet guide vane 9 of the present invention is able to be operated to the shut-off flow rate without generating surge. It is obvious that the combination of variable-angle diffuser vanes in combination with inlet guide vanes significantly improves the performance range of a turbomachine well into the low flow rate region below the designed flow rate.

A third embodiment of the turbomachinery having variable angle guide vanes is presented in FIGS. 18 to 24. The third embodiment is similar to the first embodiment in all except those sections illustrated. The attachment base 30 of the diffuser vanes 5 is provided with three pressure sensing holes 31*a,* 31*b* and 31*c,* near the pressure side, the suction side of the diffuser vanes 5 and at the entry side of the diffuser respectively, and each of the three holes is provided with a pressure side sensor 32*a,* a suction side sensor 32*b* and reference pressure sensor 32*c,* respectively.

As shown in FIG. 19, the variable vane angle pump comprises: a computing processor U having a computation section 41 and a memory section 42; operating data inputting device 43 for inputting the operational data; a first drive controller 44 for variable control of the diffuser vanes 5; a second drive controller for control of the inlet guide vane 9; a third drive controller for control of the rotational speed of the impeller 3, i.e., the rotational speed of the system; and the computing processor U is electrically connected to each of the output terminals of the pressure sensors 32*a,* 32*b* and 32*c.*

The computing processor U computes a dynamic pressure ΔPd in accordance with the pressure $P_3$ measured by the reference pressure sensor 32*c.* The computing processor U computes a pressure difference at the pressure holes 31*a* and 31*b,* ($P_1-P_2$), and determines an operating angle of the diffuser vanes on the basis of a ratio ξ, which is a ratio of the pressure difference ($P_1-P_2$) to the dynamic pressure ΔPd.

This step can be performed as shown in FIG. 20, for example. This graph is obtained from the present experimental investigation, where the x-axis represents the non-dimensional flow rate obtained by dividing the operational flow rates by the design flow rates and the y-axis represents the diffuser vane angle.

In FIG. 20, at non-dimensional flow rates higher than 0.6, the vane angles were determined by computing the dynamic pressure ΔPd from the pressure measurements obtained by the pressure sensor 32*c,* determining the pressure difference of the pressure sensors at the holes 32*a,* 32*b,* obtaining the ratio $\xi=(P_1-P_2)/\Delta Pd$, and computing the diffuser vane angle from the value of the ratio and setting this angle on the diffuser vanes by operating the first drive controller 44.

A method of obtaining the dynamic pressure ΔPd is explained in the following.

The radial component $Cm_2$ of the absolute velocity is given by the following equation:

$$Cm_2=(1/Pr)^{(1/\kappa)}Q/(\pi D_2 b_2 B),$$

where Pr is a pressure ratio at the pressure sensor 32*c* to the pressure at the impeller inlet $P_{in}$, ($Pr=P_3/P_{in}$), Q is the flow rate, and B is the blockage coefficient at the impeller exit.

The tangential component $Cu_2$ of the absolute velocity is given by the following equation:

$$Cu_2 = \sigma U_2 - Cm_2 \cot \beta_2,$$

where the slip factor of the impeller is υ, the tip speed of the impeller is $U_2$ and the vane angle at the impeller exit is $\beta_2$.

Therefore, the absolute velocity C at the impeller exit is given by:

$$C^2 = Cm_2^2 + Cu_2^2.$$

The fluid density $\rho_2$ at the exit of the impeller is given by:

$$\rho_2 = \rho_1 (Pr)^{1/\kappa)},$$

where $\rho_1$ is the fluid density at the impeller inlet.

Therefore, the dynamic pressure ΔPd is given by:

$$\Delta Pd = C^2/2\rho_2,$$

and ξ is obtained as follows:

$$\xi = (P_1 - P_2)/\ \Delta Pd.$$

The value of ξ with respect to the flow angle is predetermined in a test wind tunnel. FIG. 21 shows one such example, where the x-axis represents the vane angle with respect to the flow and the y-axis represents the ratio ξ as defined above. The dynamic pressure ΔPd is obtained by measuring the total pressure Pt and the static pressure Ps, and this method is a general method different from the method described above. The curve is memorized in the memory section, and the vane angle with respect to the flow is computed from the ratio ξ at the exit of the compressor.

In the meantime, because the flow angle at the exit of the impeller is given by:

$\alpha = \arctan\ (Cm_2/Cu_2)$, therefore, the difference between the two produces the diffuser angle with respect to the flow. By adjusting the vane angle by the amount of the difference, it is possible to align the diffuser vane angle to the exit flow angle of the impeller. If it is not possible to match the angle one the first try, the steps are repeated until the coincidence is obtained.

In FIG. 20, the data in the region below the non-dimensional flow rate of 0.06 were obtained by connecting the pressure sensor 32*c* to the dynamic pressure measuring device, and obtaining the fluctuations Fp over the measuring interval of time. In other words, the value of Fp was obtained by the method explained in FIG. 7, comparing the Fpd value with the threshold value Y and controlling the vane angle so that fluctuation of the operating parameter is maintained below the threshold value by adjusting the angle of the diffuser vanes 5 by operating the first drive controller 44. The vane angles shown in FIG. 20 are those obtained by the steps outlined above. The threshold value for stable operation of the turbomachine can be determined by experiments. FIG. 22 shows the results for the diffuser only in terms of the same co-ordinates as those in FIG. 8 In this graph also, 1.5 is the limit of operation of Fp/Fpd and the threshold value is taken as 1.5 Fpd.

The graph data below the non-dimensional flow rate 0.6 is obtained by adjusting the diffuser vanes 5 so as to maintain the operating parameter to be below the threshold value. From the results shown in FIG. 20, it can be seen that the diffuser vane angle below the non-dimensional flow rate 0.6 varies in proportion to the flow rate.

The above step in combination with calculation of the inlet flow rate to the pump and the head rise are performed to obtained the vane angle, and the pump is operated at its optimum operation point using the first drive controller to adjust the diffuser vane 5 to the calculated vane angle.

The present investigation established an additional fluid guide device so that the full capability of the pump can be attained by setting the angle of the inlet guide vane 9 at the inlet of the impeller. A flow chart for the operational steps is shown in FIG. 23.

If the system is provided with a capability for rotational speed control, a suitable speed is pre-entered in the system In step 1, a required flow rate Q, a head value H are entered, and in step 2, a flow coefficient ϕ and a pressure coefficient ϕ are calculated. In step 3, a coefficient for a curve of second order passing through point defined by the flow coefficient ϕ and the pressure coefficient ϕ is calculated. In step 4, a point of intersection with the operating point ϕ', ϕ' with the inlet guide vane 9 set at zero is calculated. In step 5, the inlet guide vane angle is calculated from the following equation:

$$\alpha = \arctan\ (k\ (\phi' - \phi)/(\phi').$$

Next, in step 6, the inlet guide vane angle adjustment is performed, and in step 7, it is examined whether the vane is fully open, that is, α is zero. If α is not zero, in step 9, the head value and the flow rate are measured, and ϕ", ϕ" are calculated. In step 10, it is examined whether the head value H is appropriate or not, and if it is appropriate, the control process is completed. If the value H is not appropriate, in step 11, α' is calculated, and in step 12, the quantity (α−α') is calculated, and the process step returns to step 6.

When the value of α is zero in step 6, if the rotational speed cannot be changed, the input conditions cannot be established and the process step returns to step 1 to reset the operational setting, and if the rotational speed can be changed, the speed is changed in step 8, and the process step proceeds to step 9.

The basis of the above equation will be considered in the following. FIG. 24 is a graph to explain the relationship between the pump characteristics and the system resistance curve. It is assumed, at the start, that the performance of the pump when the inlet guide vane angle is zero is known.

First, the flow rate Q and the head value H for the required operation of the pump are used to calculate the flow coefficient $\phi(=4Q/(\pi D_2^2 U_2^2)$ and the pressure coefficient $\phi(=gH/U_2^2)$ are calculated.

By assuming that the curve passing through the operating point (ϕ, ϕ) and the origin is a curve of second order, (if there is a fixed system resistance, this is obtained from the intercept on the ϕ-axis), the coefficient of the curve is obtained. The co-ordinates (ϕ', ϕ') of the intersection point of the curve with the known performance curve of the pump at zero vane angle is obtained by computation or other method.

From the value of ϕ', the flow rate Q' is obtained by the following equation:

$$Q' = \phi' \pi D_2^2 U_2/4.$$

Letting the area of the impeller be $A_1$, the following equation provides the inlet axial velocity $Cm_1$ at the impeller from the following equation:

$$Cm_1 = Q'/A_1 = \phi' \pi D_2^2 U_2/4A_1.$$

The head value H' for the pump is obtained from the difference in a product $U_2Cu_2$ which is a product of the tip speed $U_2$ at the impeller exit and the tangential component $Cu_2$ of the absolute velocity and a product $U_1Cu_1$ which is the product of the inlet tip speed $U_1$ at the impeller inlet and the tangential component Cul of the absolute velocity from the following equation:

$$H'=(U_2Cu_2-U_{11}Cu_1)/g$$

here, $$\phi'=gH'/U_2^2,$$

therefore, $$\phi'=(U_2Cu_2-U_1Cu_1)/U_2^2$$

is obtained.

Since, the inlet guide vane angle is zero, the tangential component $Cu_1$ of the absolute velocity is zero. Therefore, the tangential component $Cu_2$ of the absolute velocity at the impeller edit is given by the following equation:

$$Cu_2=U_2\phi',$$

According to the present investigation, it was found that the tangential component $Cu_2$ of the absolute velocity depends only on the flow rate, and is independent of the inlet guide vane angle.

Using these results, the value of the operational parameter is given by:

$$\phi = (U_2^2\phi' - U_1Cu_1)/U_2^2 \\ = \phi' - U_1Cu_1/U_2^2.$$

Therefore, the tangential component $Cu_1$ of the absolute velocity is given by:

$$Cu_1=(\phi'-\phi)U_2^2/U_1.$$

The angle of the inlet guide vane to satisfy the operating parameters is given by:

$$a = \arctan(Cu_1/Cm_1) \\ = \arctan(A_1(\phi' - \phi)U_2/(D_2^2\phi' U_1)) \\ = \arctan(A_1(\phi' - \phi)U_2/D_2D_1\mathrm{rms}\phi')$$

where $D_1$rms is the root mean square diameter at the impeller inlet, and defining $k=A_1\ (D_2D_1\mathrm{rms})$ then, $$\alpha_1=\arctan\ (k\ (\phi'-\phi)\ /\phi')$$

is obtained.

As outlined above, the turbomachine is designed to control the angle of the inlet guide vane 9 so that the system can be operated at its full capability at the operating parameter entered by the operating data inputting device 43 by computing the optimum angle of the inlet guide vane 9 and adjusting the angle automatically by operating the second drive controller 45. By adjusting the angle of the inlet guide vane 9, the flow condition of the impeller 3 is changed, leading to fluctuations in the flow from the impeller exit. When the system is provided with the diffuser vanes 5, the computing processor U computes the optimum angle of the diffuser vanes 5 for the exit flow of the impeller 3.

These considerations are applicable to the system even when the rotational speed of the system (or the impeller) is changed, therefore, for any operating conditions of the system, the diffuser vane angle can be adjusted to suit the operating parameter of the system.

Depending on the angle of the inlet guide vane 9 and the diffuser vanes 5, the flow rate specified by the operating data inputting device 43 may not be achievable, and in such a case, the inlet guide vane 9 can be positioned suitably by operating the second drive controller 45 to position the inlet guide vane 9 at the appropriate angle.

In each of the embodiments presented, a computing processor U is provided in one single unit, but it is also permissible to provide separate plurality of computers and control devices in plurality. The drive controllers were presented in separate units as first, second and third drive controllers, but it is permissible to combine them in a single unit.

What is claimed is:

1. A surge detection device for detecting surge in a turbomachine comprising:

a sensor attached to a turbomachine or a pipe for monitoring at least one operating parameter selected from a group consisting of flow rate, flow speed and pressure; and a computing processor for processing output signals from said sensor and computing fluctuations in at least one operating parameter over a measuring interval of time to detect an onset of surge;

wherein said fluctuations in said at least one operating parameter are given by a standard deviation of operating data obtained during sampling duration produced by subdivisions of said measuring interval of time.

2. A surge detection device as claimed in claim 1, wherein the onset of surge is detected by comparing said fluctuations in said at least one operating parameter with a predetermined threshold value for the onset of surge in the turbomachine.

3. A surge detection device as claimed in claim 1, wherein said measuring interval of time is defined by a minimum interval of time required for nullifying fluctuations in said at least one operating parameter caused by fundamental system characteristics associated with blades of an impeller of said turbomachine.

4. A surge detection device as claimed in claim 1, wherein said sampling duration is defined by a maximum interval of time required for nullifying fluctuations in said at least one operating parameter caused by fundamental system characteristics associated with blades of an impeller of said turbomachine.

5. A surge detection device as claimed in claim 1, wherein said computing processor is provided with a control data input device for determining said measuring interval of time or said sampling duration.

6. A surge detection device as claimed in claim 1, wherein said computing processor utilizes a computed ratio of a current fluctuation in said at least one operating parameter to a fluctuation in said at least one operating parameter.

* * * * *

UNITED STATES PATENT AND TRADEMARK OFFICE

CERTIFICATE OF CORRECTION

PATENT NO. : 5,913,248 
DATED : June 15, 1999
INVENTOR(S) : Harada et al.

It is certified that error appears in the above-identified patent and that said Letters Patent is hereby corrected as shown below:

Title page,
Item [30], Foreign Application Priority Data, change the priority date for application 6-132558 to read -- May 23, 1994 --

Signed and Sealed this

Seventh Day of January, 2003

JAMES E. ROGAN
*Director of the United States Patent and Trademark Office*